(12) United States Patent
Lee

(10) Patent No.: US 12,355,948 B2
(45) Date of Patent: *Jul. 8, 2025

(54) METHOD AND APPARATUS FOR PROCESSING VIDEO SIGNAL BY SKIPPING INVERSE-TRANSFORM

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,300

(22) Filed: Mar. 12, 2024

(65) Prior Publication Data
US 2024/0223749 A1 Jul. 4, 2024

Related U.S. Application Data

(63) Continuation of application No. 17/974,962, filed on Oct. 27, 2022, now Pat. No. 11,962,762, which is a (Continued)

(30) Foreign Application Priority Data

Mar. 27, 2018 (KR) ........................ 10-2018-0035303

(51) Int. Cl.
*H04N 19/105* (2014.01)
*H04N 19/129* (2014.01)
(Continued)

(52) U.S. Cl.
CPC ......... *H04N 19/105* (2014.11); *H04N 19/129* (2014.11); *H04N 19/174* (2014.11); *H04N 19/176* (2014.11)

(58) Field of Classification Search
None
See application file for complete search history.

(56) References Cited

U.S. PATENT DOCUMENTS

| 10,356,413 B1 | 7/2019 | Sim et al. |
| 2008/0219578 A1 | 9/2008 | Lee |

(Continued)

FOREIGN PATENT DOCUMENTS

| CN | 104137545 A | 11/2014 |
| CN | 109479138 A | 3/2019 |

(Continued)

OTHER PUBLICATIONS

China National Intellectual Property Administration, Office Action of corresponding CN Patent Application No. 201980035242.5, Jun. 7, 2022.

(Continued)

*Primary Examiner* — Chikaodili E Anyikire
(74) *Attorney, Agent, or Firm* — IP Legal Services, LLC

(57) ABSTRACT

According to the present invention, there is provided a method of decoding an image, the method including: determining whether a non-zero residual coefficient is included in a current block; and decoding residual coefficients included in the current block according to a scanning order of the current block, when it is determined that the non-zero residual coefficient is included in the current block. Herein, an absolute value of the residual coefficient of which a scanning index is greater than a residual coefficient adjustment index is equal to or less than a residual coefficient adjustment reference value.

7 Claims, 15 Drawing Sheets

Related U.S. Application Data continuation of application No. 16/982,760, filed as application No. PCT/KR2019/003591 on Mar. 27, 2019, now Pat. No. 11,516,462.

(51) Int. Cl.
*H04N 19/174* (2014.01)
*H04N 19/176* (2014.01)

(56) References Cited

U.S. PATENT DOCUMENTS

| | | |
|---|---|---|
| 2013/0128966 A1 | 5/2013 | Gao et al. |
| 2013/0251026 A1 | 9/2013 | Guo et al. |
| 2013/0266074 A1 | 10/2013 | Guo et al. |
| 2014/0092965 A1 | 4/2014 | Joshi et al. |
| 2014/0092983 A1 | 4/2014 | Joshi et al. |
| 2014/0307800 A1 | 10/2014 | Sole Rojals et al. |
| 2015/0003514 A1 | 1/2015 | Hsu et al. |
| 2015/0016537 A1 | 1/2015 | Karczewicz et al. |
| 2015/0030067 A1 | 1/2015 | Zhao et al. |
| 2015/0071359 A1 | 3/2015 | Guo et al. |
| 2015/0281706 A1 | 10/2015 | Strom et al. |
| 2015/0326883 A1* | 11/2015 | Rosewarne .......... H04N 19/186 375/240.18 |
| 2015/0358621 A1 | 12/2015 | He et al. |
| 2016/0373742 A1 | 12/2016 | Zhao et al. |
| 2018/0184131 A1 | 6/2018 | Yoo et al. |
| 2019/0104322 A1* | 4/2019 | Tsukuba ................ H04N 19/61 |
| 2019/0182508 A1 | 6/2019 | Zhao et al. |
| 2019/0215524 A1* | 7/2019 | Lee ...................... H04N 19/132 |
| 2019/0230370 A1 | 7/2019 | Kirchhoffer et al. |
| 2019/0306536 A1 | 10/2019 | Lim et al. |
| 2020/0068206 A1 | 2/2020 | Hsiang et al. |
| 2021/0014479 A1 | 1/2021 | Lee |
| 2022/0014770 A1 | 1/2022 | Lee |
| 2023/0291923 A1 | 9/2023 | Lee |

FOREIGN PATENT DOCUMENTS

| | | |
|---|---|---|
| JP | 2015-534779 A | 12/2015 |
| JP | 6046235 B2 | 12/2016 |
| KR | 10-2016-0134702 A | 11/2016 |
| KR | 10-1773240 B1 | 8/2017 |
| KR | 10-2018-0007680 A | 1/2018 |
| KR | 10-2018-0025283 A | 3/2018 |

OTHER PUBLICATIONS

Benjamin Bross et al., "Versatile Video Coding (Draft 4)", Document: JVET-M1001-v7, Joint Video Experts Team (JVET) of ITU-T SG 16 WP 3 and ISO/IEC JTC 1/SC 29/WG 11, 13th Meeting: Marrakech, MA, Jan. 9-18, 2019.

Moonmo Koo et al., "CE6: Reduced Secondary Transform (RST) (CE6-3.1)", Document: JVET-N0193, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-19.

* cited by examiner

METHOD AND APPARATUS FOR PROCESSING VIDEO SIGNAL BY SKIPPING INVERSE-TRANSFORM

CROSS REFERENCE TO RELATED APPLICATIONS

This application is a Continuation of U.S. patent application Ser. No. 17/974,962 (filed on Oct. 27, 2022), which is a Continuation of U.S. patent application Ser. No. 16/982,760 (filed on Sep. 21, 2020), now issued as U.S. Pat. No. 11,516,462, which is a National Stage Patent Application of PCT International Patent Application No. PCT/KR2019/003591 (filed on Mar. 27, 2019) under 35 U.S.C. §371, which claims priority to Korean Patent Application No. 10-2018-0035303 (filed on Mar. 27, 2018), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing e data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a an method and an apparatus for efficiently splitting encoding/decoding target block in encoding/decoding a video signal.

An object of the present invention is to provide a method and an apparatus for splitting an encoding/decoding target block into blocks of a symmetric type or an asymmetric type in encoding/decoding a video signal.

An object of the present invention is to provide a method and an apparatus for setting a prediction target or transform target block to be in a size/shape different from that of a coding block, in encoding/decoding a video signal.

An object of the present invention is to provide a method and an apparatus for adaptively determining a size/shape of a sub-block for which a residual coefficient encoding indicator is encoded/decoded, in encoding/decoding a video signal.

An object of the present invention is to provide a method and an apparatus for setting an absolute value of a residual coefficient to be equal to or lower than a preset value, in encoding/decoding a video signal.

The technical objects to be achieved by the present invention are not limited to the above-mentioned technical problems. And, other technical problems that are not mentioned will be apparently understood to those skilled in the art from the following description.

Technical Solution

According to the present invention, there is provided a method and an apparatus for decoding a video signal, wherein it is determined whether a non-zero residual coefficient is included in a current block, and when it is determined that the non-zero residual coefficient is included in the current block, residual coefficients included in the current block are decoded according to a scanning order of the current block. Herein, an absolute value of the residual coefficient of which a scanning index is greater than a residual coefficient adjustment index is equal to or less than a residual coefficient adjustment reference value.

According to the present invention, there is provided a method and an apparatus for encoding a video signal, wherein it is determined whether a non-zero residual coefficient is included in a current block, and when it is determined that the non-zero residual coefficient is included in the current block, residual coefficients included in the current block are encoded according to a scanning order of the current block. Herein, an absolute value of the residual coefficient of which a scanning index is greater than a residual coefficient adjustment index is equal to or less than a residual coefficient adjustment reference value.

In the method and the apparatus for encoding/decoding the video signal according to the present invention, the residual coefficient adjustment index may be determined on the basis of at least one among a size of the current block, and a position of a last significant residual coefficient.

In the method and the apparatus for encoding/decoding the video signal according the present invention, the residual coefficient adjustment reference value may be one, the absolute value of the residual coefficient may be set the same as a value of a residual level indicator, and the residual level indicator may indicate whether the absolute value of the residual coefficient is greater than zero.

In the method and the apparatus for encoding/decoding the video signal according to the present invention, the residual coefficient adjustment reference value may be set different for each slice.

In the method and the apparatus for encoding/decoding the video signal according to the present invention, the residual coefficient adjustment reference value may be set the same as an absolute value of the residual coefficient of which the scanning index is the residual coefficient adjustment index.

In the method and the apparatus for encoding/decoding the video signal according to the present invention, the determining of whether the non-zero residual coefficient is included in the current block may be performed on the basis of a residual coefficient encoding indicator of the current block.

The features briefly summarized above for the present invention are only illustrative aspects of the detailed description of the invention that follows, but do not limit the scope of the invention.

Advantageous Effects

According to the present invention, encoding/decoding efficiency can be improved by efficiently splitting an encoding/decoding target block.

According to the present invention, encoding/decoding efficiency can be improved by splitting an encoding/decoding target block into blocks of a symmetric type or an asymmetric type.

According to the present invention, a size/shape of a prediction target or transform target block is set different from that of the coding block, so that encoding/decoding efficiency can be improved.

According to the present invention, a size/shape of a sub-block for which a residual coefficient encoding indicator is encoded/decoded is adaptively determined, so that encoding/decoding efficiency can be improved.

According to the present invention, an absolute value of a residual coefficient is set to a preset value or less, so that encoding/decoding efficiency can be improved.

The effects obtainable by the present invention are not limited to the above-mentioned effects, and other effects not mentioned can be clearly understood by those skilled in the art from the description below.

MODE FOR INVENTION

Figure 1:
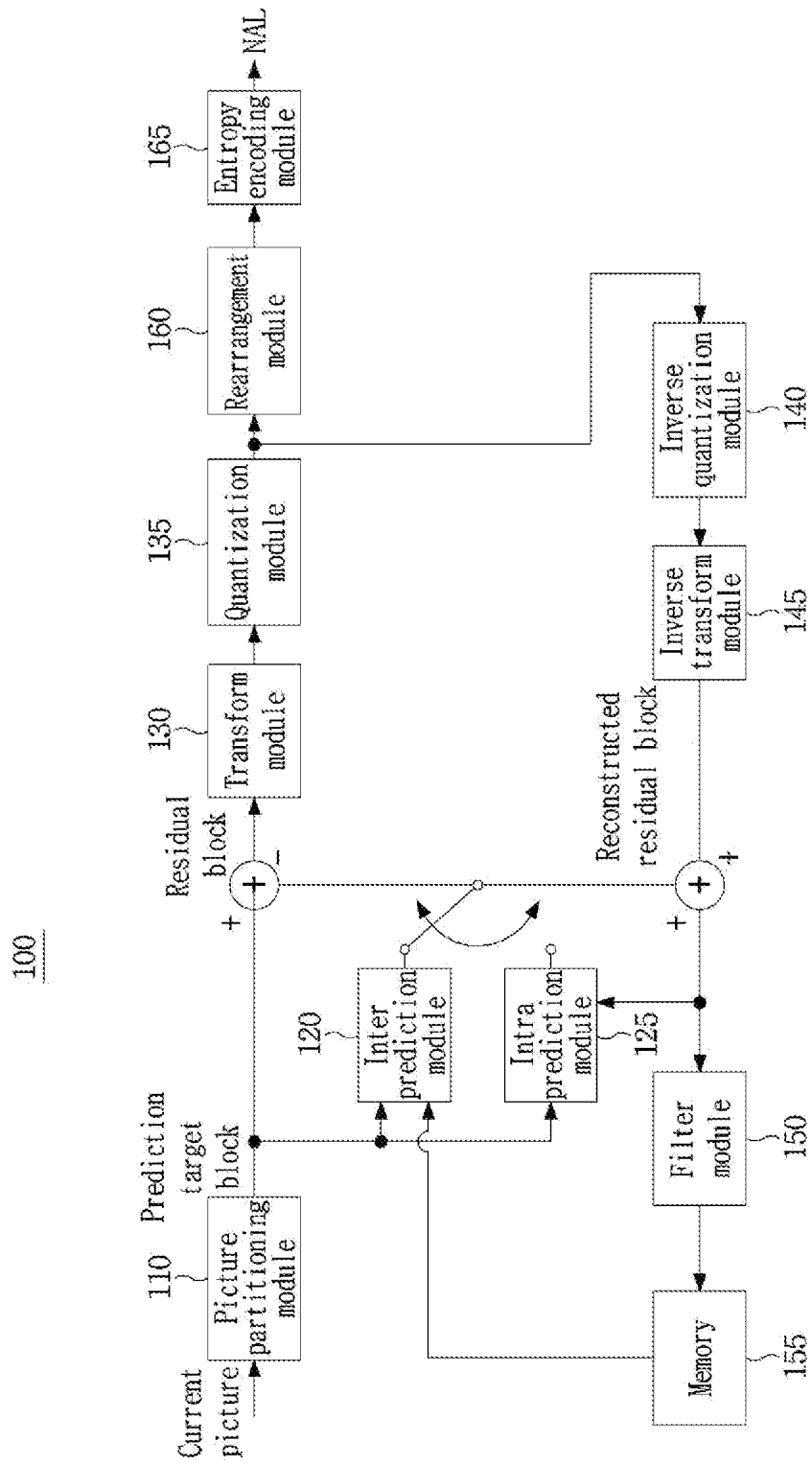
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply 'connected to' or 'coupled to' another referred to as being element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

FIG. 1 The constitutional parts shown in are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an Here, the input picture into one or more processing units. processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

n the intra prediction method, a prediction block may be generated an (Adaptive Intra after applying AIS Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient t in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed each group.

Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
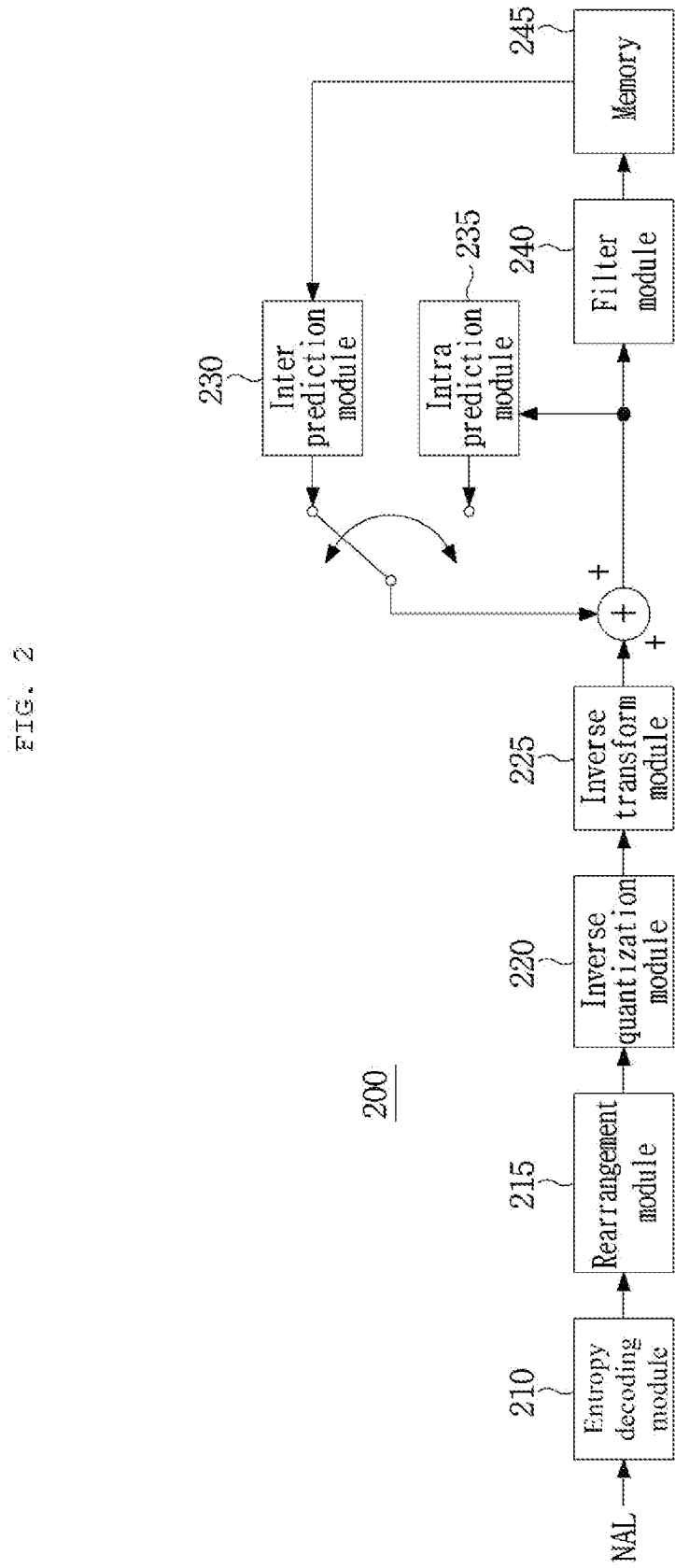
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement 215 module may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this specification, 'unit' represents a basic unit for performing a specific encoding/decoding processes, and 'block' may represent a sample array of a predetermined size. If there is no distinguish between them, the terms 'block' and 'unit' may be used interchangeably. For example, in the embodiments described below, it can be understood that a coding block and a coding unit have mutually equivalent meanings.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is unit a base for performing prediction, quantization, transform or in-loop filtering and the like.

Alternatively, a prediction block having the same size as the coding block or smaller than the coding block may be determined through predictive partitioning of the coding block. For predictive partitioning of the coding block, one of partition mode (Part_mode) candidates may be specified. Information for determining a partition index indicating one of the partition may be signaled via bitstream. Alternatively, a partition index of the coding block may be determined based on at least one of a size, shape or encoding mode of the current block. A size or shape of a prediction block may be determined based on a partition mode specified by the partition index. The partition mode candidates may include an asymmetric partition type (for example, nL×2N, nR×2N, 2N×nU, 2N×nD). The number or type of asymmetric partition mode candidates available to the coding block may be determined based shape or encoding mode of the current block.

Figure 3:
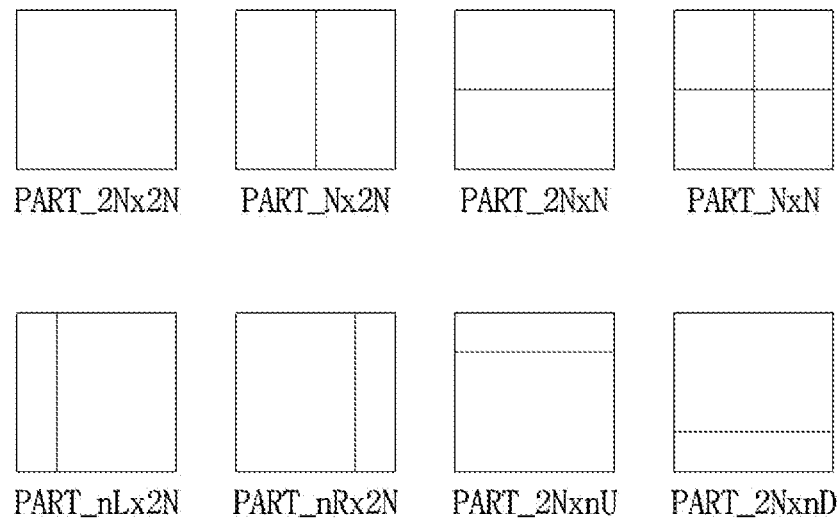
FIG. 3 is a diagram illustrating partition mode candidates that can be applied to a coding block when the coding block is encoded by inter prediction.

FIG. 3 illustrates partition mode candidates that can be applied to a coding block when the coding block is encoded by inter prediction.

When the coding block is encoded using inter prediction, any one of eight partition mode candidates shown in FIG. 3 is applied to the coding block.

Conversely, when the coding block is encoded using intra prediction, only partitioning of a square-shape partition is applied to the coding block. That is, when the coding block is encoded using intra prediction, a partition mode PART_2N×2N or PART_N×N is applied to the coding block.

The partition mode PART_N×N is applied when the coding block is in a minimum size. Herein, the minimum size of the coding block may be predefined in the encoder and the decoder. Alternatively, information on the minimum size of the coding block may be signaled through a bitstream. For example, the minimum size of the coding block may be signaled through a slice header. Accordingly, different minimum sizes of the coding block may be determined for respective slices.

As another example, partition mode candidates that the coding block is able to use may be set different according to at least one among the size and the shape of the coding block. For example, the numbers or types of partition mode candidates that the coding block is able to use may be set different according to at least one among the size and the shape of the coding block.

Alternatively, on the basis of the size or the shape of the coding block, types or the number of asymmetric partition mode candidates that the coding block is able to use may be determined. The number or types of asymmetric partition mode candidates that the coding block is able to use may be set different according to at least one among the size and the shape of the coding block. For example, when the coding block is in a non-square shape of which the width is greater than the height, at least one of partition modes PART_2N×N, PART_2N×nU, and PART_2N×nD is not used as a partition mode candidate of the coding block. When the coding block is in a non-square shape of which the height is greater than the width, at least one of partitions modes PART_N×2N, PART_nL×2N, and PART_nR×2N is not used as a partition mode candidate of the coding block.

In general, the size of the prediction block ranges from a size of 64×64 to a size of 4×4. However, in the case where the coding block is encoded using inter prediction, in order to reduce the memory bandwidth when performing motion compensation, a prediction block is set not to be in a 4×4 size.

On the basis of the partition mode, the coding block may be partitioned in a recursive manner. That is, on the basis of a partition mode determined by a partition index, the coding block may be partitioned to generate multiple partitions, and each of the partitions may be defined as a coding block.

Hereinafter, a method of partitioning the coding unit in a recursive manner will be described in more detail. In an embodiment described later, a coding unit may refer to a coding tree unit or a coding unit included in a coding tree unit. In addition, the "partitions" generated as a result of partitioning the coding block may refer to "coding blocks".

The coding unit may be partitioned by at least one line. Herein, the angle of the line that partitions the coding unit has a value within a range from 0 degrees to 360 degrees. For example, the angle of the horizontal line may be a 0 degree angle, the angle of the vertical line may be a 90 degree angle, the angle of the diagonal line in a right upward direction may be a 45 degree angle, and the angle of the diagonal line in a left upward direction may be a 135 degree angle.

When the coding unit is partitioned by multiple lines, the multiple lines are at the same angle. Alternatively, at least one of the multiple lines may be at a different angle from another line. Alternatively, the multiple lines that partition the coding tree unit or the coding unit may have a predefined difference in angle (for example, a 90 degree angle).

Information on a line partitioning the coding unit may be determined by a partition mode. Alternatively, information on at least one among the number of lines, a direction, an angle, and a position of a line within a block may be encoded.

For convenience of description, in an embodiment described later, it is assumed that a coding unit is partitioned into multiple coding units by using at least one among a vertical line and a horizontal line.

The number of vertical lines or horizontal lines that partition the coding unit may be at least one. For example, the coding unit may be partitioned into two partitions by using one vertical or line one horizontal line. Alternatively, the coding unit may be partitioned into three partitions by using two vertical lines or two horizontal lines. Alternatively, by using one vertical line and one horizontal line, the coding unit may be partitioned into four partitions, wherein each of the four partitions has the width and the height that are ½ of those of the coding unit.

When the coding unit is partitioned into multiple partitions by using at least one vertical line or at least one horizontal line, the partitions are in the uniform sizes. Alternatively, any one partition may be in a different size from the other partitions, or partitions may be in different sizes, respectively. For example, when the coding unit is partitioned with two horizontal lines or two vertical lines, the coding unit is partitioned into three partitions. Herein, a width ratio or a height ratio of the three partitions may be n:2n:n, 2n:n:n, or n:n: 2n.

In embodiments described later, partitioning the coding unit into four partitions is referred to as quad tree-based partitioning, and partitioning the coding unit into two partitions is referred to as binary tree-based partitioning.

In the drawings described later, it is shown that one vertical line and/or one horizontal line is used to partition the coding unit. However, it is also included in the scope of the present invention that by using a larger number of vertical lines and/or horizontal lines than the lines shown in the drawings, the coding unit is partitioned into a larger or smaller number of partitions than the partitions shown in the drawings.

Figure 4:
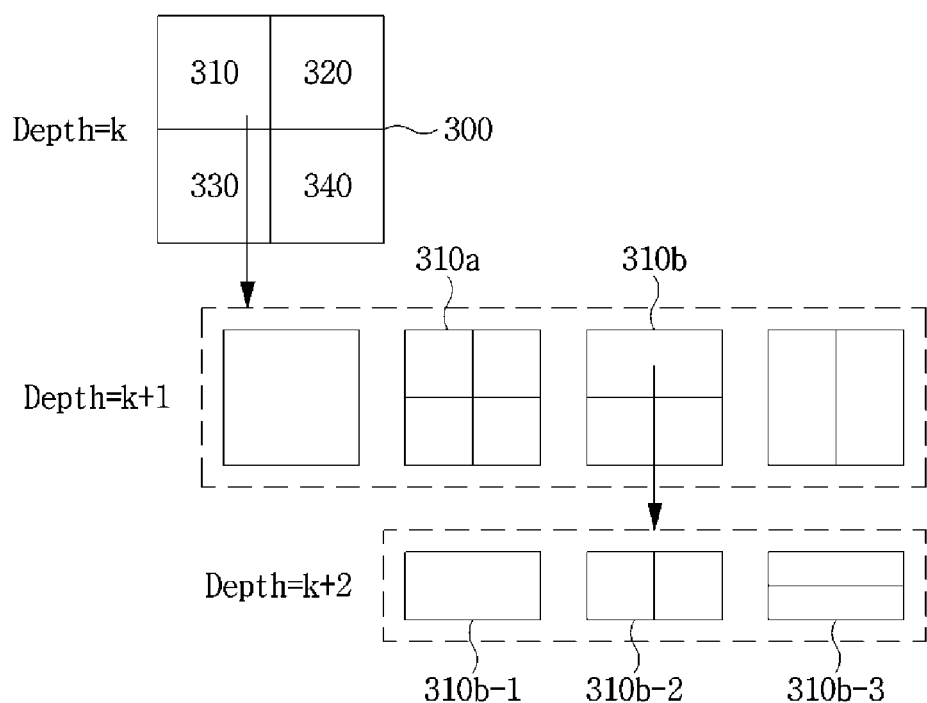
FIG. 4 is a diagram illustrating an example of hierarchically partitioning a coding block based on a tree structure according to an embodiment of the present invention.

FIG. 4 is a diagram illustrating an example of hierarchically partitioning a coding block based on a tree structure according to an embodiment of the present invention.

An input video signal is decoded in predetermined block units. Such a default unit for decoding the input video signal coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree partitioning method or a binary tree partitioning method. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

The partitions generated through binary tree-based partitioning may be in a symmetric shape or an asymmetric shape. In addition, a coding block resulting from binary tree-based partitioning may be a square block or a non-square block (for example, a rectangular block).

Figure 5:
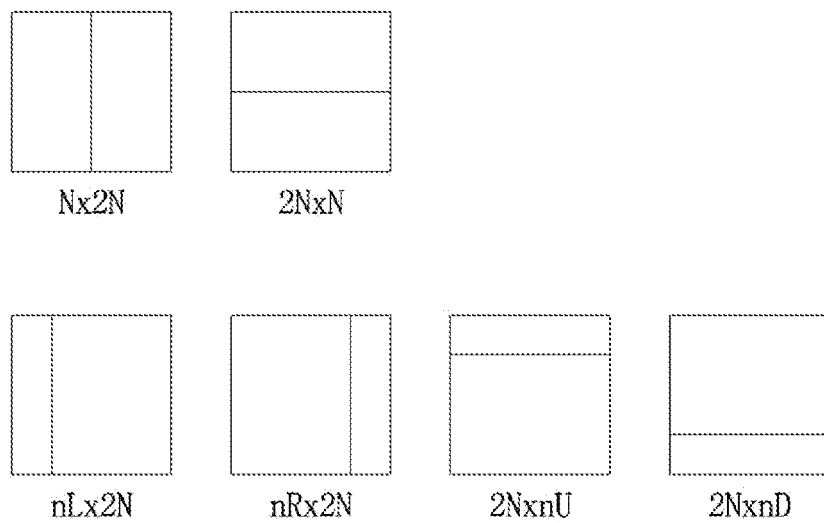
FIG. 5 is a diagram illustrating a partition type in which binary tree-based partitioning is allowed according to an embodiment of the present invention.

FIG. 5 is a diagram illustrating partition types of a coding block based on binary-tree partitioning. A partition shape of a coding block based on binary-tree partitioning may include a symmetric type, such as 2N×N (a horizontal non-square coding unit), N×2N (a vertical non-square coding unit), or the like, or an asymmetric type, such as nL×2N, nR×2N, 2N×nU, 2N×nD, or the like. Any one among the symmetric type or the asymmetric type is allowed as a partition type of the coding block.

Only partitioning in a square shape or a non-square symmetric shape is allowed for the coding unit. In this case, partitioning the coding unit into square partitions may correspond to quad-tree CU partitioning, and partitioning the coding unit into symmetric non-square partitions may correspond to binary-tree partitioning. Partitioning a coding tree unit into square partitions and symmetric non-square partitions may correspond to quad-tree and binary-tree CU partitioning (QTBT).

Binary tree-based partitioning may be performed on a coding block for which quad tree-based partitioning is no longer performed. For the coding block resulting from binary tree-based partitioning, quad tree-based partitioning may no longer be performed.

In addition, partitioning a child depth partition may be determined dependently on a partition type of a parent depth partition. For example, when a parent partition and a child partition are partitioned on the basis of a binary tree, only binary tree-based partitioning of the same type as a binary-tree partition type of a parent depth partition is allowed in a child depth partition. For example, when the binary-tree partition type of the parent depth partition is a 2N×N type, the binary-tree partition type of the child depth partition is also set to be a 2N×N type. Alternatively, when the binary-tree partition type of the parent depth partition is an N×2N type, the partition type of the child depth partition is also set to be an N×2N type.

Alternatively, a partition type of a child depth partition may be determined considering a partition type of a parent depth partition and a partition type of a neighboring child depth partition. Specifically, when a parent depth partition is partitioned on the basis of a binary tree, a partition type of a child depth partition is determined in such a manner as not to generate the same result as a result of partitioning the parent depth partition on the basis of a quad tree. For example, when the partition type of the parent depth partition is 2N×N and the partition type of the neighboring child depth partition is N×2N, a partition type of a current child depth partition is not set to N×2N. This is because, when the partition type of the current child depth partition is N×2N, the same result as a result of N×N-type quad-tree partitioning the parent depth partition is caused. When the partition type of the parent depth partition is N×2N and the partition type of the neighboring child depth partition is 2N×N, a partition type of a current child depth partition is not set to 2N×N. That is, when a binary-tree partition type of a parent depth partition is different from a binary-tree partition type of a neighboring child depth partition, a binary-tree partition type of a current child depth partition is set the same as the binary-tree partition type of the parent depth partition.

Alternatively, a binary-tree partition type of a child depth partition may be set different from a binary-tree partition type of a parent depth partition.

An allowable partition type may be determined on a per-sequence basis, a per-slice basis, or a per-coding unit basis. For example, a binary-tree partition type allowable for the coding tree unit may be limited to a 2N×N or N×2N type. The allowable partition type may be predefined in the encoder or the decoder. Alternatively, information on an allowable partition type or an unallowable partition type may be encoded and signaled through a bitstream.

Figure 6A:
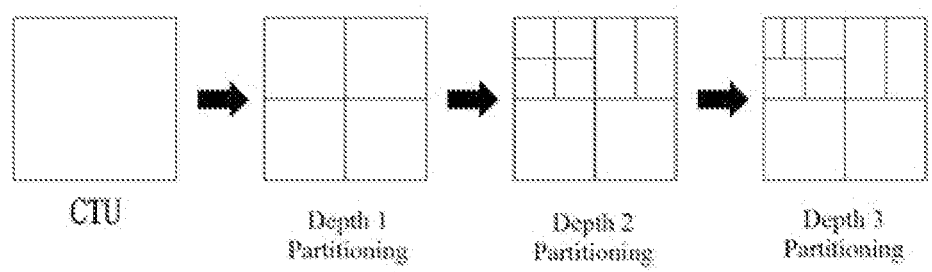
FIGS. 6A and 6B are diagrams illustrating an example in which only a binary tree-based partition of a pre-determined type is allowed.
Figure 6B:
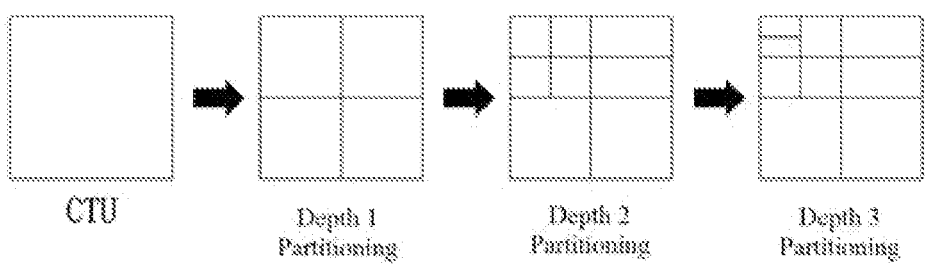

FIGS. 6A and 6B are diagrams illustrating an example in which only a specific type of binary tree-based partitioning is allowed.

FIG. 6A shows an example in which only N×2N type of binary tree-based partitioning is allowed, and FIG. 6B shows an example in which only 2N×N type of binary tree-based partitioning is allowed.

In order to implement adaptive partitioning based on the quad tree or binary tree, at least one of information indicating quad tree-based partitioning, information on the size/depth of block that tree-based the coding quad partitioning is allowed, information indicating binary tree-based partitioning, information on the size/depth of the coding block that binary tree-based partitioning is allowed, information on the size/depth of the coding block that binary tree-based partitioning is not allowed, or information on whether binary tree-based partitioning is performed in a vertical direction or a horizontal direction may be used.

In addition, at least one of information on the number of times a binary tree partitioning is allowed, a depth at which the binary tree partitioning is allowed, or the number of the depths at which the binary tree partitioning is allowed may be obtained for a coding tree unit or a coding unit. Those information may be encoded in a unit of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Alternatively, the number of times that binary-tree partitioning is allowed, the depth at which binary-tree partitioning is allowed, or the number of depths at which binary-tree partitioning is allowed may be predefined in the encoder and the decoder. Alternatively, the number of times that binary-tree partitioning is allowed, the depth at which binary-tree partitioning is allowed, or the number of depths at which binary-tree partitioning is allowed may be determined on the basis of at least one among an index of a sequence or slice, and a size/shape of a coding unit. For example, in a first slice, binary-tree partitioning may be allowed at one depth, and in a second slice, binary-tree partitioning may be allowed at two depths.

Figure 7:
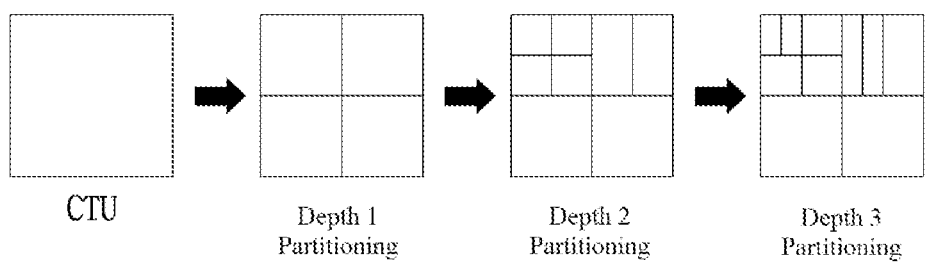
FIG. 7 is a diagram for explaining an example in which information related to the allowable number of binary tree partitioning is encoded/decoded, according to an embodiment to which the present invention is applied.

Referring to the example shown in FIG. 7, in FIG. 7, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth of a partition which is generated by the binary tree partitioning in the coding tree unit (i.e., depth 3), or the number of partition depths in which the binary tree partitioning has been applied in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

Information for determining a partition type of a coding unit may be signaled through a bitstream. The decoder may decode the information from a bitstream, and may partition the coding unit.

Figure 8:
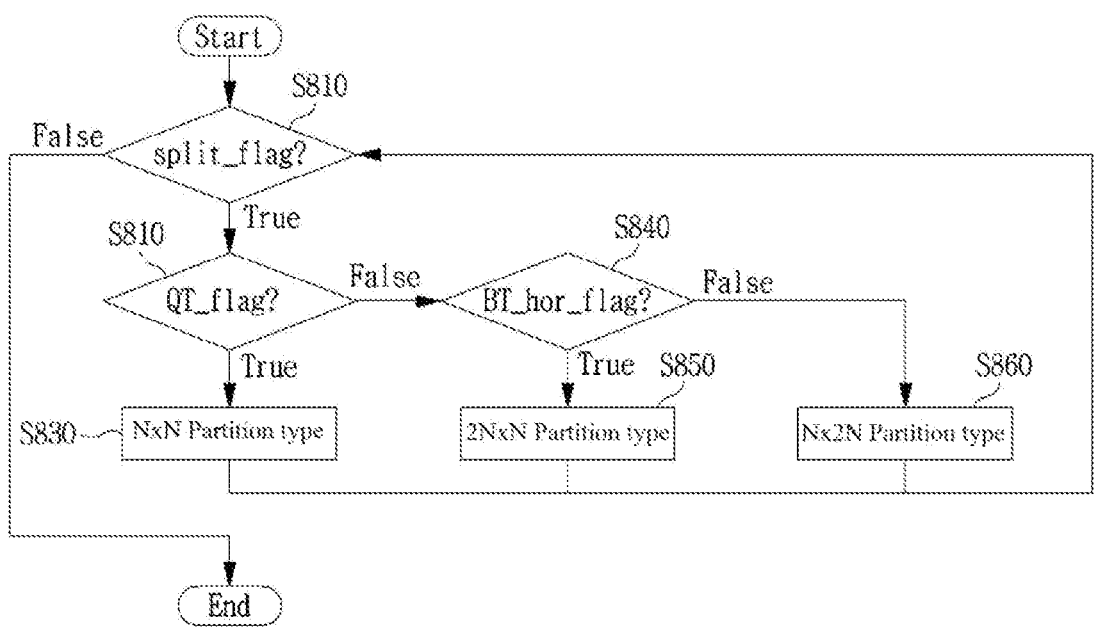
FIG. 8 is a flowchart illustrating a process of determining a partition type of a coding unit on the basis of partition information encoded in a hierarchical manner.

FIG. 8 is a flowchart illustrating a process of determining a partition type of a coding unit on the basis of partition information encoded in a hierarchical manner.

On the basis of a split_flag, it may be determined whether to partition a current coding unit into child depth coding units at step S810. Whether to partition the current coding unit into child depth coding units is indicated by the split_flag. When the split_flag has a value of true, a QT_flag or a BT_flag for determining the partition type of the coding unit is decoded at step S820. Whether the coding unit is quad-tree partitioned is indicated by the QT_flag. Whether the coding unit is binary-tree partitioned is indicated by the BT_flag. Only one among the QT_flag and the BT_flag may be selectively encoded. When the QT_flag has a value of true or the BT_flag has a value of false, the coding unit is partitioned into four coding units at step S830. When the QT_flag has a value of false or the BT_flag has a value of true, the coding unit is partitioned into two coding units. When the QT_flag has a value of false or the BT_flag has a value of true, a BT_hor_flag or a BT_ver_flag indicating a partition direction of the coding unit is decoded at step S840. Whether the coding unit is in partitioned a horizontal direction is indicated by the BT_hor_flag. Whether the coding unit is partitioned in a vertical direction is indicated by the BT_ver_flag. Only one among the BT_hor_flag and the BT_ver_flag may be selectively encoded. When the BT_hor_flag has a value of true or the BT_ver_flag has a value of false, the coding unit is partitioned in a horizontal direction (2N×N) at step S850. When the BT_hor_flag has a value of false or the BT_ver_flag has a value of true, the coding unit is partitioned in a vertical direction (N×2N) at step S860.

A process of partitioning a coding unit into multiple child depth coding units, and of determining a partition type for each of the child depth coding units may be performed in a recursive manner. Herein, it may be set that quad-tree partitioning is not allowed for a coding unit in a non-square shape or a coding unit generated as a result of binary-tree partitioning. Whether to partition a coding unit in a non-square shape or generated as a result of binary-tree partitioning may follow FIG. 9 described below.

Figure 9:
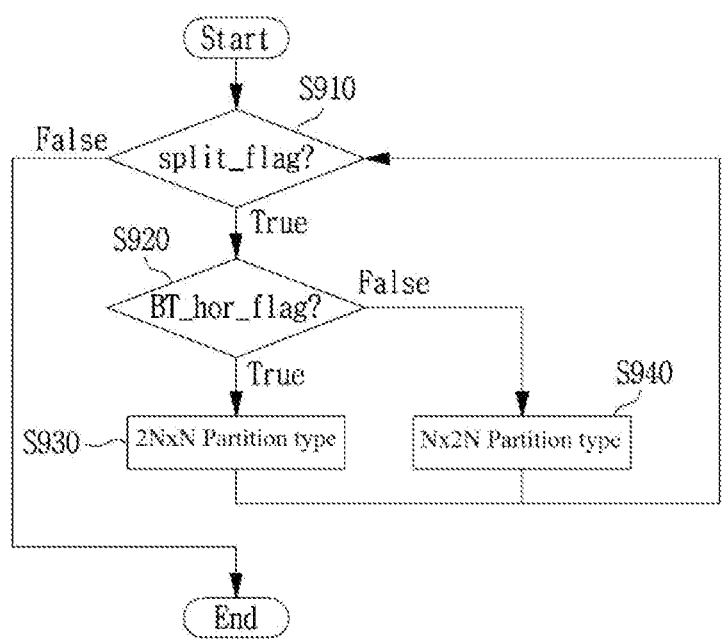
FIG. 9 is a flowchart illustrating a process of determining a partition type of a coding unit in a non-square shape on the basis of partition information.

FIG. 9 is a flowchart illustrating a process of determining a partition type of a coding unit in a non-square shape on the basis of partition information.

On the basis of a split_flag, it may be determined whether to partition a current coding unit into child depth coding units at step S910. When the split_flag has a value of true, a BT_hor_flag or a BT_ver_flag indicating a partition direction of the coding unit is decoded at step S920. Only one among the BT_hor_flag and the BT_ver_flag may be selectively encoded. When the BT_hor_flag has a value of true or the BT_ver_flag has a value of false, the coding unit is partitioned in a horizontal direction (2N×N) at step S930. When the BT_hor_flag has a value of false or the BT_ver_flag has a value of true, the coding unit is partitioned in a vertical direction (N×2N) at step S940.

In the above-described embodiment, it has been described that whether to partition the coding block is determined using the split_flag. As another example, the encoding of the split_flag may be omitted, and whether to partition the coding block may be determined on the basis of at least one among the QT_flag and the BT_flag. For example, when the QT_flag has a value of true, the coding block is partitioned into four partitions. When the QT_flag has a value of false and the BT_flag has a value of true, the coding block is partitioned into two partitions. When the QT_flag and the BT_flag have values of false, the coding block is no longer partitioned.

As shown in FIG. 4, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

The number of candidate sizes may be limited to a predetermined number, or a size of a coding block in a predetermined unit may have a fixed value. As an example, the size of the coding block in a sequence or in a picture may be forced to have one of 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

As a result of partitioning based on a quad tree and a binary tree, the coding block that is no longer partitioned may be used as a prediction block or a transform block. That is, it may be used as a coding block generated as a result of quad-tree partitioning or binary-tree partitioning, a prediction block or a transform block. For example, a prediction image may be generated on a per-coding block basis, and a residual signal that is a difference between an original image and a prediction image may be transformed on a per-coding block basis. In order to generate a prediction image on a per-coding block basis, motion information may be determined on the basis of a coding block, or an intra prediction mode may be determined on the basis of a coding block. Accordingly, the coding block may be encoded using at least one among a skip mode, intra prediction, and inter prediction.

As another example, by partitioning the coding block, a prediction block or a transform block that is in a size smaller than that of the coding block may be used.

A binary tree-based partition type of a coding block may be set in such a manner that only symmetric partitioning is allowed. However, even in the case where an object and a background are divided at a block boundary, when only symmetric binary partitioning is allowed, encoding efficiency is lowered. Thus, in the present invention, there is proposed a method of partitioning a coding block into asymmetric partitions in order to improve encoding/decoding efficiency.

As a result of asymmetric binary-tree partitioning, the coding block may be partitioned into two smaller coding blocks. The two coding blocks may be in different sizes. The partitioning of the coding block into two partitions in the same size may be defined as symmetric binary-tree partitioning. The partitioning of the coding block into two partitions in different sizes may be defined as asymmetric binary-tree partitioning. The binary-tree partition type may include at least one among a symmetric binary-tree partition type and an asymmetric binary-tree partition type.

Figure 10:
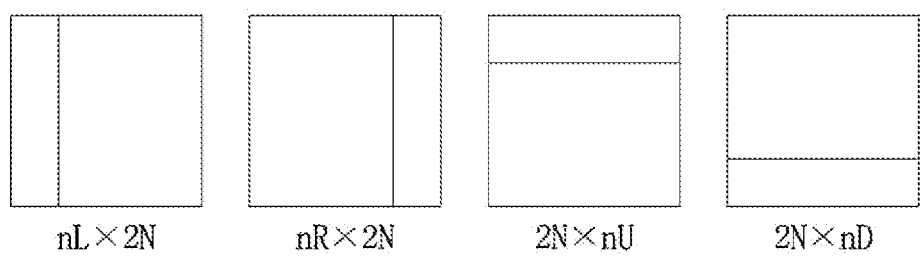
FIG. 10 illustrates a partition type of a coding block based on asymmetric binary tree partitioning.

FIG. 10 is a diagram illustrating a partition type of a coding block based on asymmetric binary-tree partitioning.

A 2N×2N coding block may be partitioned into two coding blocks having a width ratio of n:(1-n), or two coding blocks having a height ratio of n:(1-n). Herein, n may represent a real number that is greater than zero and smaller than one.

For example, a width ratio or a height ratio of the coding blocks generated as a result of asymmetric binary-tree partitioning may be 1:3 or 3:1.

Specifically, as a coding block in a W×H size is partitioned in a vertical direction, a left partition having the width of W/4 and a right partition having the width of 3W/4 are generated. As above, the partition type in which the width of the left partition is smaller than the width of the right partition may be referred to as nL×2N binary partition.

As a coding block in a W×H size is partitioned in a vertical direction, a left partition having the width of 3W/4 and a right partition having the width of W/4 are generated. As above, the partition type in which the width of the right partition is smaller than the width of the left partition may be referred to as nR×2N binary partition.

As a coding block in a W×H size is partitioned in a horizontal direction, an upper partition having the height of H/4 and a lower partition having the height of 3H/4 are generated. As above, the partition type in which the height of the upper partition is smaller than the height of the lower partition may be referred to as 2N×nU binary partition.

As a coding block in a W×H size is partitioned in a horizontal direction, an upper partition having the height of 3H/4 and a lower partition having the height of H/4 are generated. As above, the partition type in which the height of the lower partition is smaller than the height of the upper partition may be referred to as 2N×nD binary partition.

The width ratio or the height ratio of two coding blocks generated as a result of asymmetric binary-tree partitioning may be predefined in the encoder and the decoder. Alternatively, information indicating the width ratio or the height ratio of the two coding blocks may be signaled through a bitstream. Alternatively, the width ratio or the height ratio of the two coding blocks may be determined on the basis of at least one among a shape, a size, an encoding mode, a scanning order, and an intra prediction mode of the coding block.

An asymmetric binary partition shape of the coding block may be determined on the basis of information signaled through a bitstream. For example, a partition type of the coding block may be determined on the basis of information indicating a partition direction of the coding block, and information indicating whether a first partition generated as a result of partitioning the coding block is in a size smaller than that of a second partition.

The information indicating the partition direction of the coding block may be a one-bit flag that indicates whether the coding block is partitioned in a vertical direction or a horizontal direction. For example, among any one a hor_binary_flag and a ver_binary_flag may be signaled through a bitstream. Whether the coding block is partitioned in a horizontal direction may be indicated by the hor_binary_flag, and whether the coding block is partitioned in a vertical direction may be indicated by the ver_binary_flag. When the hor_binary_flag has a value of one or the ver_binary_flag has a value of zero, the coding block is partitioned in a horizontal direction. When the hor_binary_flag has a value of zero or the ver_binary_flag has a value of one, the coding block is partitioned in a vertical direction.

Information indicating whether the first partition is a size smaller than that of the second partition may be a one-bit flag. For example, any one among an is_left_above_small_part_flag and an is_right_bottom_small_part_flag may be signaled through a bitstream. Whether the size of the left or upper partition generated as a result of partitioning the coding block is smaller than that of the right or lower partition is indicated by the is_left_above_small_part_flag, and whether the size of the right or lower partition generated as a result of partitioning the coding block is smaller than that of the left or upper partition is indicated by the is_right_bottom_small_part_flag. When the is_left_above_small_part_flag has a value of one or the is_right_bottom_small_part_flag has a value of zero, the size of the left or upper partition is set smaller than that of the right or lower partition. When the is_left_above_small_part_flag has a value of zero or the is_right_bottom_small_part_flag has a value of one, the size of the left or upper partition is set larger than that of the right or lower partition.

For example, the hor_binary_flag having a value of zero and the is_left_above_small_part_flag having a value of one indicate nL×2N binary partition. The hor_binary_flag having a value of zero and the is_left_above_small_part_flag having a value of zero indicate nR×2N binary partition. In addition, the hor_binary_flag having value of one and the a is_left_above_small_part_flag having a value of one indicate 2N×nU binary partition. The hor_binary_flag having a value of one and the is_left_above_small_part_flag having a value of zero indicate 2N×nD binary partition.

Alternatively, a size of the first partition and a size of the second partition may be determined using information that indicates the width ratio, the height ratio, or the area ratio between the first partition and the second partition.

Alternatively, index information for determining an asymmetric binary partition shape of the coding block may be signaled, and the coding block may be partitioned on the basis of the asymmetric binary partition shape indicated by the index information. Different indexes may be allocated to the asymmetric binary partition shapes, and the index information may indicate any one of the indexes. The index information may be encoded with a fixed length (that is, a fixed number of bits) or a variable length. For example, Table 1 below represents partition indexes and binary codes of index information corresponding thereto.

TABLE 1

|  | Asymmetric partition index | Binarization |
|---|---|---|
| nL × 2N | 0 | 0 |
| nR × 2N | 1 | 10 |
| 2N × nU | 2 | 100 |
| 2N × nD | 3 | 111 |

Whether binary-tree partitioning an asymmetric method is used may be determined dependently on whether a quad-tree partitioning method and a symmetric binary-tree partitioning method are used. For example, when it is determined not to apply quad-tree partitioning or symmetric binary-tree partitioning to the coding block, it is determined whether to apply asymmetric binary-tree partitioning to the coding block. For example, when both of the QT_flag and the BT_flag have values of false, information indicating whether asymmetric binary-tree partitioning is applied to the coding block is encoded/decoded. The information may be a one-bit flag "asymmetric_binary_tree_flag". The asymmetric_binary_tree_flag having a value of one indicates application of asymmetric binary-tree partitioning to the coding block, and the asymmetric_binary_tree_flag having a value of zero indicates no application of asymmetric binary-tree partitioning to the coding block.

Alternatively, when it is determined to apply binary-tree partitioning to the coding block, it is determined whether a partition type of the coding block is a symmetric type or an asymmetric type. For example, when the split_flag has a value of true and the QT_flag has a value of false, or when the split_flag has a value of true and the BT_flag has a value of true, information indicating a partition type of the coding block is encoded/decoded. The information may be a one-bit flag "is_asymmetric_split_flag". The is_asymmetric_split_flag having a value of one indicates the fact that a partition type of the coding block is an asymmetric type, and the is_asymmetric_split_flag having a value of zero indicates the fact that a partition type of the coding block is a symmetric type.

Alternatively, different indexes may be allocated to a symmetric binary partition shape and an asymmetric binary partition shape, and a partition shape of the coding block may be determined on the basis of index information that indicates one of multiple partition shapes. For example, Table 2 represents partition indexes and binary codes of index information corresponding thereto.

TABLE 2

|  | Binary partition index | Binarization |
|---|---|---|
| 2N × N (horizontal binary partition) | 0 | 0 |
| N × 2N (vertical binary partition) | 1 | 10 |
| nL × 2N | 2 | 110 |
| nR × 2N | 3 | 1110 |
| 2N × nU | 4 | 11110 |
| 2N × nD | 5 | 11111 |

The coding block may be partitioned into multiple coding blocks through quad-tree partitioning, symmetric binary-tree partitioning, or asymmetric binary-tree partitioning.

Figure 11:
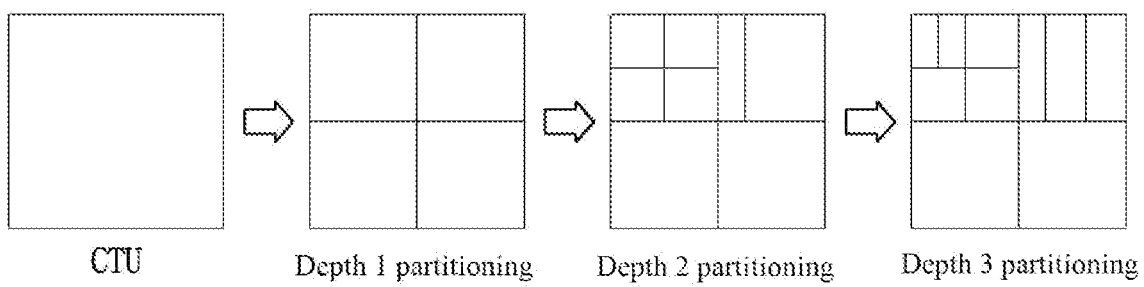
FIG. 11 is a diagram illustrating an example in which a coding block is partitioned into multiple coding blocks on the basis of quad-tree partitioning, symmetric binary-tree partitioning, and asymmetric binary-tree partitioning.
Figure 11:
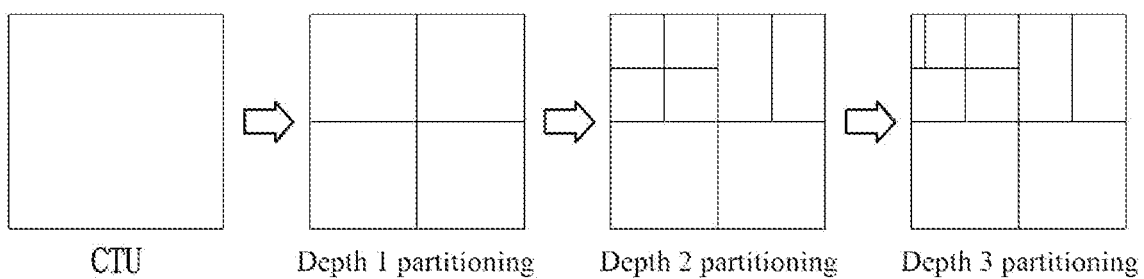
Figure 11:
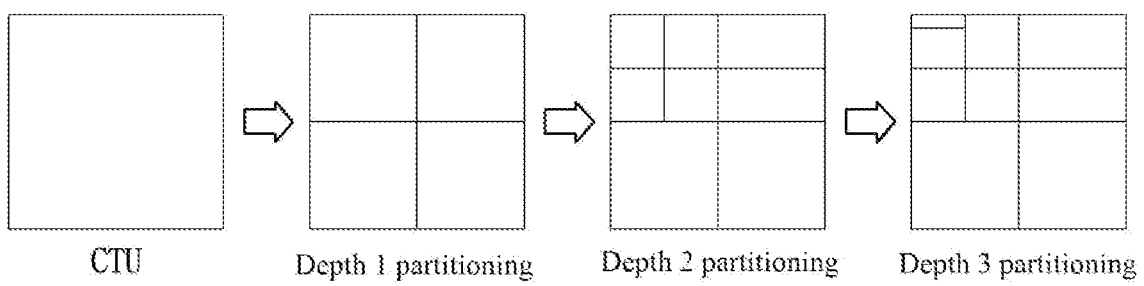

FIG. 11 is a diagram illustrating an example in which a coding block is partitioned into multiple coding blocks on the basis of quad-tree partitioning, symmetric binary-tree partitioning, and asymmetric binary-tree partitioning. Referring to FIG. 11, it is found that in depth-2 partitioning of the first figure, depth-3 partitioning of the second figure, and depth-3 partitioning of the third figure, asymmetric binary-tree partitioning is performed.

The coding block resulting from asymmetric binary-tree partitioning may be set not to be partitioned into smaller coding blocks. For example, at least one among information indicating whether partitioning is performed on the coding block that is generated through asymmetric binary-tree partitioning, information indicating whether quad-tree partitioning is performed, information indicating whether symmetric binary-tree partitioning is performed, information indicating whether asymmetric binary-tree partitioning is performed, information indicating a partition direction, and information indicating a partition shape may not be encoded/decoded. That is, for the coding block generated through asymmetric binary-tree partitioning, the encoding/decoding of syntax related to a flag indicating whether quad-tree partitioning is performed, a flag indicating whether binary-tree partitioning is performed, a flag indicating whether symmetric binary-tree partitioning is performed, a flag indicating whether asymmetric binary-tree partitioning is performed, a flag indicating a direction of binary-tree partitioning, or index information indicating a partition shape may be omitted.

In a picture, a slice, or a coding tree unit where QTBT is not allowed, asymmetric binary-tree partitioning may also not be allowed. Alternatively, information indicating whether asymmetric binary-tree partitioning is allowed may be encoded on a per-block basis, a per-slice basis, or a per-picture basis and may be signaled. The information may be a one-bit flag. For example, the is_used_asymmetric_QTBT_enabled_flag having a value of zero may indicate the fact that asymmetric binary-tree partitioning is not allowed. Alternatively, after whether a binary tree is allowed is determined, whether asymmetric binary-tree partitioning is allowed may be determined. For example, at a picture level or a slice level, when it is determined that binary-tree partitioning is allowed, whether asymmetric binary-tree partitioning is performed is determined through the is_used_asymmetric_QTBT_enabled_flag. Alternatively, at a picture level or a slice level, when it is determined that binary-tree partitioning is not allowed, the is_used_asymmetric_QTBT_enabled_flag is not signaled, but the value thereof is set to zero.

Consequently, asymmetric binary-tree partitioning is unable to be applied to coding blocks that are included in a picture, a slice, or a coding tree unit where QTBT or asymmetric binary-tree partitioning is not allowed. Thus, encoding/decoding information related to asymmetric binary-tree partitioning for the coding blocks may be omitted. Alternatively, a value of syntax related to asymmetric binary-tree partitioning may be set so that asymmetric binary-tree partitioning is not applied to the coding blocks.

A partition type allowed for the coding block may be determined on the basis of a size, a shape, a partition depth of a coding block, a partition type of a parent node coding block, or the like. For example, at least one among a partition type, a partition shape, and the number of partitions may be different between a coding block generated through quad-tree partitioning and a coding block generated through binary-tree partitioning.

For example, any one among quad-tree partitioning, binary-tree partitioning, and asymmetric binary-tree partitioning may be selectively applied to a coding block generated through quad-tree partitioning. That is, when the coding block generated on the basis of quad-tree is partitioning, candidates for a partitioning method applicable to the coding block include quad-tree partitioning, binary-tree partitioning, and asymmetric binary-tree partitioning. As a result, at least one partition shape among 2N×2N, N×2N, 2N×N, N×N, nL×2N, nR×2N, 2N×nU, and 2N×nD may be applied to the coding block. The 2N×2N partition represents a case in which the coding block is no longer partitioned. The N×N represents a case in which the coding block is quad-tree partitioned. The N×2N and the 2N×N represent a case in which the coding block is subjected to symmetric binary-tree partitioning. The nL×2N, nR×2N, 2N×nU, or 2N×nD represents a case in which the coding block is subjected to asymmetric binary-tree partitioning.

For example, asymmetric binary-tree partitioning may not be allowed for the coding block generated through binary-tree partitioning. That is, an asymmetric partition shape, such as the nL×2N, nRx2N, 2N×nU, 2N×nD, or the like, may not be applied to the coding block.

Various partition types of the coding block have been described through the above-described embodiments. Hereinafter, additional various partition types other than the above-described partition types will be described.

In addition to the method of partitioning the coding block into four square blocks, asymmetric quad-tree partitioning (asymmetric quad-tree CU partitioning) may be allowed. A coding block is partitioned in an asymmetric shape using at least one among a horizontal line that partitions the coding block into two, and a vertical line that partitions the coding block into two, thereby performing asymmetric quad-tree partitioning. For example, a partition shape in which the horizontal line partitions the coding block in an asymmetric shape, while the vertical line partitions the coding block in a symmetric shape; a partition shape in which the horizontal line partitions the coding block in a symmetric shape, while the vertical line partitions the coding block in an asymmetric shape; or a partition shape in which the horizontal line and the vertical line partition the coding block in an asymmetric shape may be applied to the coding block. As a result of asymmetric quad-tree partitioning, a width or height of any one partition may be different from a width or height of another partition.

FIGS. 12A to 12E are diagrams illustrating partition types of a coding block based on a quad tree.

Figure 12A:
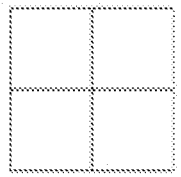
FIGS. 12A to 12E are diagrams illustrating partition types of a coding block based on a quad tree.
Figure 12B:
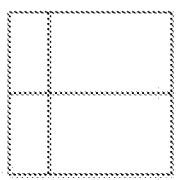
Figure 12C:
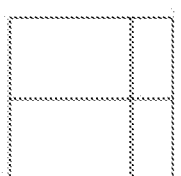
Figure 12D:
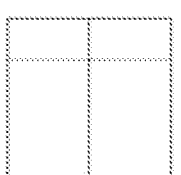
Figure 12E:
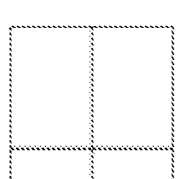

FIG. 12A shows a partition shape in which a horizontal line and a vertical line symmetrically partition a coding block. FIGS. 12B and 12C show partition shapes in which a horizontal line symmetrically partitions a coding block, while a vertical line asymmetrically partitions the coding block. FIGS. 12D and 12E show partition shapes in which a vertical line symmetrically partitions a coding block, while a horizontal line asymmetrically partitions the coding block.

Information related to a quad-tree partition type may be encoded in a bitstream. The information may be index information that indicates any one of multiple partition shape candidates. For example, different indexes may be allocated to the multiple partition shape candidates shown in FIGS. 12A to 12E. In addition, a quad-tree partition type of the coding block may be determined on the basis of the index information that indicates an index of any one of the multiple partition shape candidates. Alternatively, the information may include an indicator that indicates whether the quad-tree partition type is a symmetric type or an asymmetric type. The indicator may be encoded on a per-block basis. For example, when the indicator indicates a value of true, it is determined that a quad-tree partition type of the coding block is symmetric partitioning (FIG. 12A). When the indicator indicates a value of false, it is determined a partition type of the coding block is any one of asymmetric partition types (FIGS. 12B, 12C, 12D, and 12E). When the indicator indicates a value of false, index information indicating any one of asymmetric partition types is further encoded/decoded. Alternatively, when the indicator indicates a value of false, at least one among vertical partition information and horizontal partition information described below is further encoded/decoded.

Alternatively, at least one among vertical partition information indicating whether a vertical line symmetrically partitions and the coding block, horizontal partition information indicating whether a horizontal line symmetrically partitions the coding block may be encoded/decoded. A quad-tree partition type of the coding block may be determined on the basis of at least one among the vertical partition information and the vertical partition information.

Alternatively, a value of any one among the horizontal partition information and the vertical partition information may be determined on the basis of a value of the other. That is, only one among the horizontal partition information and the vertical partition information may be encoded, and a value of the other may be determined on the basis of a value of the encoded information. For example, the horizontal partition information and the vertical partition information may have different values. When the horizontal partition information indicates asymmetric partitioning, it is determined that the vertical partition information is symmetric partitioning. Alternatively, when the vertical partition information indicates asymmetric partitioning, it is determined that the horizontal partition information is symmetric partitioning.

When the horizontal partition information indicates asymmetric partitioning, at least one among information on a position of a horizontal line that asymmetrically partitions the coding block, and information on heights of the coding blocks generated through horizontal partitioning is further encoded/decoded. When the vertical partition information indicates asymmetric partitioning, at least one among information on a position of a vertical line that asymmetrically partitions the coding block, and information on widths of the coding blocks generated through vertical partitioning is further encoded/decoded.

In addition to the quad-tree partitioning method in which one vertical line and one horizontal line are used, a quad-tree partitioning method in which multiple vertical lines or multiple horizontal lines are used may be used. For example, a quad-tree partition type in which multiple vertical lines and one horizontal line, or multiple horizontal lines and one vertical line are used, or a quad-tree partition type in which multiple vertical lines or multiple horizontal lines are used may be applied to the coding block.

Figure 13:
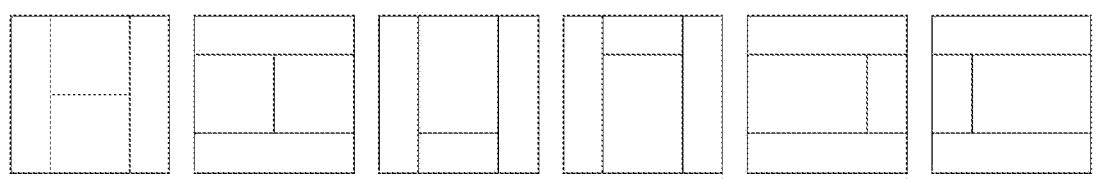
FIG. 13 is a diagram illustrating quad-tree partition types using multiple vertical lines or multiple horizontal lines.

FIG. 13 is a diagram illustrating quad-tree partition types using multiple vertical lines or multiple horizontal lines.

A quad-tree partition type may include a type in which the coding block is partitioned into three blocks using two vertical lines, and then any one of the three blocks resulting from partitioning is partitioned using one horizontal line. Herein, the horizontal line may be used in partitioning any one of the three blocks in a symmetric shape or an asymmetric shape. In addition, the quad-tree partition type may include a type in which the coding block is partitioned into three blocks using two horizontal lines, and then any one of the three blocks resulting from partitioning is partitioned using one vertical line. Herein, the vertical line may be used in partitioning any one of the three blocks in a symmetric shape or an asymmetric shape.

As in the example shown in FIG. 13, among the three blocks generated as the coding block is partitioned using two vertical lines or two horizontal lines, the block positioned in the middle may be further partitioned. Alternatively, the quad-tree partition type may include a type in which the block positioned at the edge of the coding block among the three blocks is further partitioned.

The partition to be further partitioned among the three partitions may be predefined in the encoder and the decoder. For example, a width ratio or a height ratio of the three partitions generated by partitioning the coding block with two horizontal lines or two vertical lines, may be n: 2n:n, 2n:n:n, or n:n: 2n. The partition having the greatest width or height among the three partitions may be determined as a further partitioning target. Alternatively, information (for example, a partition index) for specifying the partition to be further partitioned among the three partitions may be signaled through a bitstream.

As in the example shown in FIG. 13, the quad-tree partition type may include at least one among a partition type in which the coding block is partitioned by combining multiple vertical lines and one horizontal line, and a partition type in which the coding block is partitioned by combining multiple horizontal lines and one vertical line. By the quad-tree partitioning, the coding block may be partitioned into two partitions in a first size/first shape, and two partitions in a second size/second shape. Alternatively, by the quad-tree partitioning, the coding block may be partitioned into one partition in a first size/first shape, one partition in a second size/second shape, and two partitions in a third size/third shape. As above, the quad-tree partition type in which the number of sizes or shapes of the four partitions is two or three may be defined as a triple-type asymmetric quad-tree partitioning (triple-type asymmetric quad-tree CU partitioning).

Information on triple-type asymmetric quad-tree partitioning may be encoded through n a bitstream. The information may include at least one among information indicating whether triple-type asymmetric quad-tree partitioning is allowed, information indicating whether the coding block is subjected to triple-type asymmetric quad-tree partitioning, and information indicating a partition type of triple-type asymmetric quad-tree partitioning. The information indicating the partition type may include at least one among index information indicating any one of multiple partition shape candidates, information on the number of horizontal lines or vertical lines, information on a position of a horizontal line or a vertical line, and information indicating a width ratio or a height ratio of partitions.

Quad-tree partitioning represents partitioning the coding block into four blocks, and coding binary-tree partitioning represent partitioning the coding block into two coding blocks. A partition type in which the coding block is partitioned into three coding blocks or five or more coding blocks may be defined. The partitioning of the coding block into three partitions may be defined as triple-tree partitioning. A triple-tree partition type may include at least one among a type in which the coding block is partitioned using two vertical lines, and a type in which the coding block is partitioned using two horizontal lines. Three non-square partitions may be generated through triple-tree partitioning.

Figure 14:
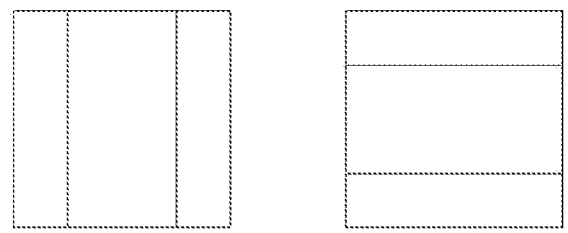
FIG. 14 is a diagram illustrating triple-tree partition types.

FIG. 14 is a diagram illustrating triple-tree partition types.

A triple-tree partition type may include a type in which the coding block is partitioned using two horizontal lines, or a type in which the coding block is partitioned using two vertical lines. A width ratio or a height ratio of the partitions generated as a result of partitioning the coding block may be n: 2n:n, 2n:n:n, or n:n: 2n.

A position of the partition having the greatest width or height among the three partitions may be predefined in the encoder and the decoder. Alternatively, information indicating the partition having the greatest width or height among the three partitions may be signaled through a bitstream.

The coding block generated as a result of triple-tree partitioning may be partitioned into coding blocks in a smaller size. Alternatively, for prediction or transform, the coding block generated as a result of triple-tree partitioning may be partitioned into prediction blocks or transform blocks in a smaller size. Alternatively, among the three coding blocks generated as a result of triple-tree partitioning, only the coding block having the largest size may be partitioned into coding blocks in a smaller size.

As another example, the coding block generated as a result of triple-tree partitioning may be set not to further partitioned.

Alternatively, it may be set not to apply at least one among quad-tree partitioning, triple-tree partitioning, and binary-tree partitioning to the coding block generated as a result of triple-tree partitioning. For example, it may be set that quad-tree partitioning and triple-tree partitioning are not allowed for the coding block generated as a result of triple-tree partitioning. Only binary-tree partitioning may be allowed for the coding block.

Figure 15A:
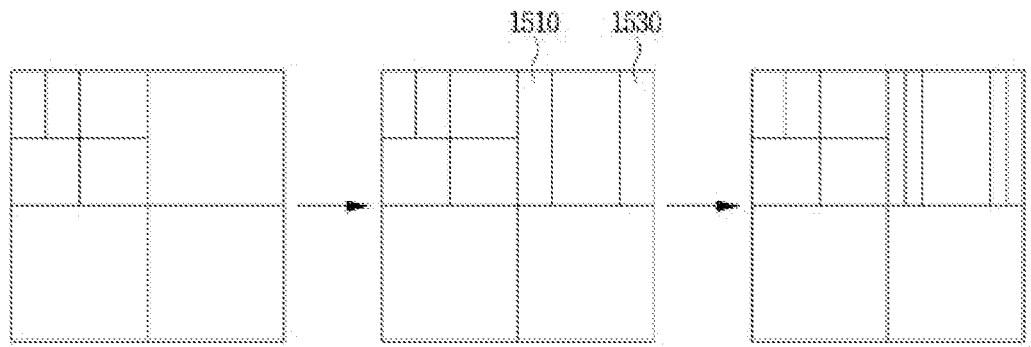
FIGS. 15A to 15C are diagrams illustrating additional partition types of a coding block generated as a result of triple-tree partitioning.

FIGS. 15A to diagrams illustrating 15C are additional partition types of a coding block generated as a result of triple-tree partitioning.

It may be set that at least one among the quad-tree partitioning method and the triple-tree partitioning method is not allowed for the coding block generated as a result of triple-tree partitioning. It may be set that only the binary-tree partitioning method is allowed for the coding block generated as a result of triple-tree partitioning.

Figure 15B:
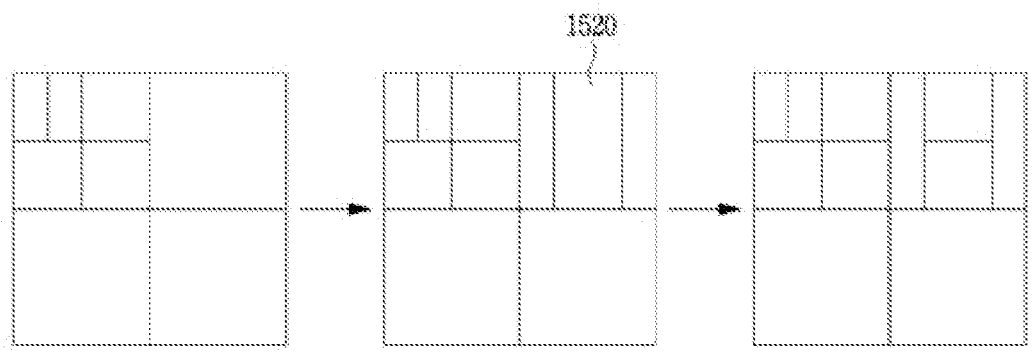
Figure 15C:
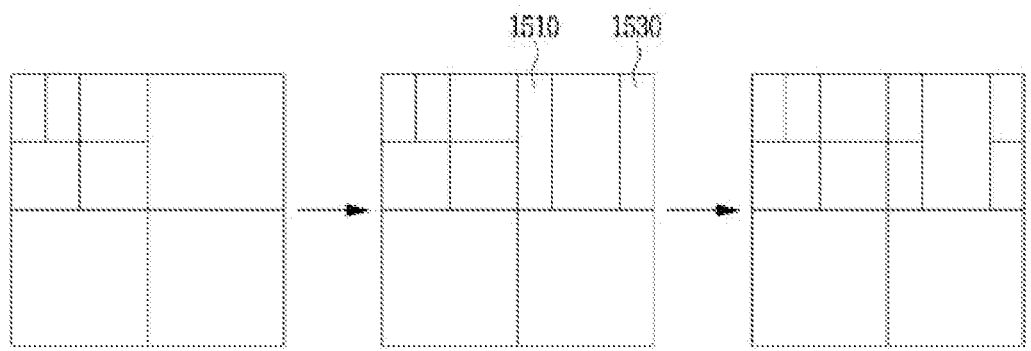

FIG. 15A shows an example in which among the coding blocks generated as a result of triple-tree partitioning, binary partitioning in a vertical direction is applied to the two coding blocks 1510 and 1530 having a small width. FIG. 15B shows an example in which among the coding blocks generated as a result of triple-tree partitioning, binary partitioning in a horizontal direction is applied to the coding block 1520 having the greatest width. FIG. 15C shows an example in which among the coding blocks generated as a result of triple-tree partitioning, binary partitioning in a horizontal direction is applied to the two coding blocks 1510 and 1530 having a small width.

It may be set that among the coding blocks generated as a result of triple-tree partitioning, binary-tree partitioning in the same direction as the above-described triple-tree partitioning is not allowed for the coding block having the largest size. For example, as in the example shown in FIG. 15B, among the coding blocks generated as a result of triple-tree partitioning in a vertical direction, only binary-tree partitioning in a vertical direction may be allowed for the coding block having the greatest width. Accordingly, for the coding block, encoding/decoding information that indicates a direction of binary-tree partitioning may be omitted.

Whether triple-tree partitioning is allowed may be determined according to a width, a height, a ratio between a width and a height, a size, or a shape of the coding block. For example, triple-tree partitioning may not be allowed for at least one of the following cases: a case in which at least one among a width and a height of the coding block is equal to or greater than a predefined value; a case in which the size of the coding block is equal to or greater than a predefined value, and a case in which a ratio between the width and the height of the coding block is equal to or greater than a predefined value. Alternatively, triple-tree partitioning may be allowed only for the case in which the coding block is in an M×N size. Herein, N and M may be natural numbers having the same value or different values. For example, N and M may have values of 4, 8, 16, 32, 64, or more.

Alternatively, information indicating the width, the height, the size, the ratio between the width and the height, or the shape of the coding block for which triple-tree partitioning is allowed may be encoded and transmitted through a bitstream. The information may indicate the maximum value or the minimum value. For example, when the width, the height, the size, or the ratio between the width of the height of the coding block is equal to or greater than the minim value indicated by the information, or when the width, the height, the size, the ratio between the width and the height of the coding block is equal to or less than the maximum value indicated by the information, triple-tree partitioning is allowed for the coding block. Alternatively, the size or the shape of the block for which triple-tree partitioning is allowed may have a fixed value predetermined in the encoder/decoder.

Alternatively, information indicating whether triple-tree partitioning is allowed may be signaled through a bitstream. The information may be signaled at a picture level, a slice level, a tile group level, a tile level, or a block level. The information may be a one-bit flag. When the coding block is included in a parent level at which triple-tree partitioning is not allowed, encoding and decoding information related to triple-tree partitioning for the coding block are omitted. When the coding block is included in a parent level at which triple-tree partitioning is allowed, information related to a partition type encoded/decoded for the coding block includes information related to triple-tree partitioning.

Information indicating whether the coding block is triple-tree partitioned may be signaled through a bitstream. The information may be a one-bit flag. For example, a TT_flag indicating whether the coding block is triple-tree partitioned may be encoded/decoded. The TT_flag having a value of true indicates the fact that the coding block is partitioned into three coding blocks. The TT_flag having a value of false indicates the fact that triple-tree partitioning is not applied to the coding block.

Alternatively, whether triple-tree partitioning is applied to the coding block may be determined using a QT_flag or a BT_flag. For example, the QT_flag having a value of true may indicate the fact that the coding block is quad-tree partitioned, and the QT_flag having a value of false may indicate the that fact the block coding is triple-tree partitioned.

Alternatively, the BT_flag having a value of true may indicate the fact that the coding block is binary-tree partitioned, and the BT_flag having a value of false may indicate the fact that the coding block is triple-tree partitioned. The BT_flag is encoded/decoded when the QT_flag has a value of false, or when the coding block is a non-square partition and a split_flag has a value of one.

When triple-tree partitioning is applied to the coding block, at least one among information indicating a partition direction of the coding block, and information indicating sizes of partitions generated as a result of partitioning the coding block is further signaled. The information indicating the partition direction may indicate whether a partition direction of the coding block is a horizontal direction or whether a partition direction of the coding block is a vertical direction. When the partition direction of the coding block is a horizontal direction, the coding block is partitioned into three coding blocks by two horizontal lines. When the partition direction of the coding block is a vertical direction, the coding block is partitioned into three coding blocks by two vertical lines.

When the coding block is triple-tree partitioned, the partitions included in the coding block share motion information, a merge candidate, a reference sample, an intra prediction mode, or the like according to the size or the shape of the coding block. For example, when a current coding block is triple-tree partitioned and the size or the shape of the current coding block satisfies a predetermined condition, the coding blocks within the current coding block share at least one among a spatial, a temporal neighboring block candidate for inter prediction, a reference sample for intra prediction, and an intra prediction mode. Alternatively, it may be set that only some of the coding blocks within the current coding block share the information and the remaining coding blocks do not share the information.

Summarizing the embodiments described above, a method of partitioning the coding block may include at least one among the quad-tree partitioning method, the binary-tree partitioning method, and the triple-tree partitioning method. Quad-tree partitioning may include at least one among symmetric quad-tree partitioning, asymmetric quad-tree partitioning, and triple-type asymmetric quad-tree partitioning. Binary-tree partitioning may include at least one among symmetric binary-tree partitioning, and asymmetric binary-tree partitioning. A method of partitioning the coding block by using at least one among the quad-tree partitioning method, the binary-tree partitioning method, and the triple-tree partitioning method described above may be referred to as a multi-tree partitioning (or multiple-tree partitioning) method.

Figure 16:
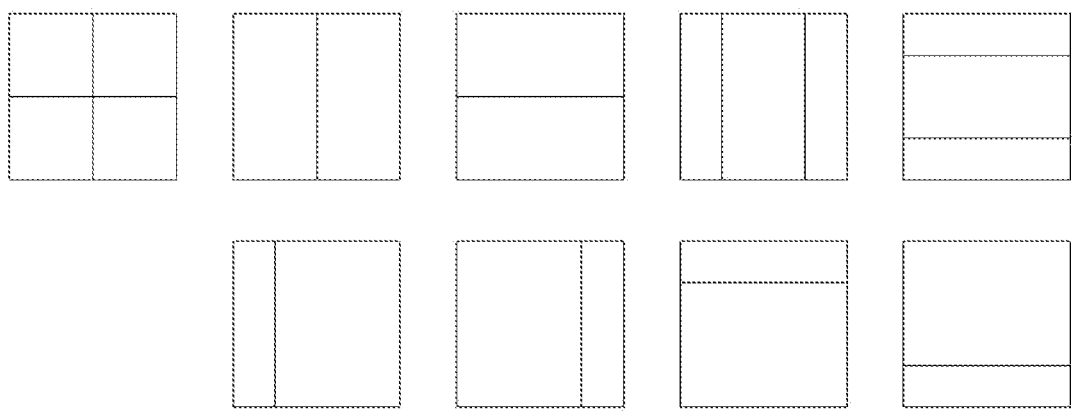
FIG. 16 is a diagram illustrating partition types applicable to a coding block.

FIG. 16 is a diagram illustrating partition types applicable to a coding block.

When symmetric quad-tree partitioning, symmetric binary-tree partitioning, asymmetric binary-tree partitioning, and triple-tree partitioning are allowed, it is determined that a partition type of the coding block is any one of nine partition types shown in FIG. 16.

At least one among whether quad-tree partitioning is allowed, whether binary-tree partitioning is allowed, and whether triple-tree partitioning is allowed may be determined at a sequence level, a picture level, a slice level, a tile group level, or a tile level. Information indicating whether each partition method is allowed may be signaled through a bitstream. The information may be a one-bit flag. For example, at least one among an isUseQuadTreeFlag indicating whether the quad-tree partitioning method is allowed, an isUseBinaryTreeFlag indicating whether the binary-tree partitioning method is allowed, and an isUseTripleTreeFlag indicating whether the triple-tree partitioning method is allowed may be signaled through a bitstream. Depending on whether each partition method is allowed, the coding blocks included in a parent level may be partitioned using quad-tree partitioning, binary-tree partitioning, and triple-tree partitioning, or the coding blocks included in a parent level may be partitioned using one or two partition methods among quad-tree partitioning, binary-tree partitioning, and triple-tree partitioning.

Alternatively, one or some partition methods among quad-tree partitioning, binary-tree partitioning, and triple-tree partitioning may be allowed as default, and it may be selectively determined whether the remaining partition methods are allowed. For example, the quad-tree partitioning method may be allowed as default, but it may be selectively determined whether the binary-tree partitioning method or the triple-tree partitioning method is allowed. Alternatively, the quad-tree partitioning method and the triple-tree partitioning method may be allowed as default, but it may be selectively determined whether the binary-tree partitioning method allowed. Alternatively, the quad-tree partitioning method and the binary-tree partitioning method may be allowed as default, but it may be selectively determined whether triple-tree partitioning is used. Information indicating whether the binary-tree partitioning method is allowed, or information indicating whether the triple-tree partitioning method is allowed may be a one-bit flag. For example, at least one among an isUseBinaryTreeFlag indicating whether the binary-tree partitioning method is allowed, and an isUseTripleTreeFlag indicating whether the triple-tree partitioning method is allowed may be signaled through a bitstream. The information may be signaled at a sequence header, a picture level, a slice level, a tile group level, or a tile level. For example, the isUseBinaryTreeFlag having a value of one indicates the fact that coding blocks within a sequence are able to be partitioned using the binary-tree partitioning method. The isUseBinaryTreeFlag having a value of zero indicates the fact that coding blocks included in a sequence are unable to be partitioned using the binary-tree partitioning method. When the binary-tree partitioning method is not allowed, encoding/decoding information related to binary-tree partitioning for the coding blocks is omitted.

Alternatively, the isUseTripleTreeFlag having a value of one indicates the fact that coding blocks included in a sequence are able to be partitioned using the triple-tree partitioning method. The isUseTripleTreeFlag having a value of Zero indicates the fact that coding blocks included in a sequence are unable to be partitioned using the triple-tree partitioning method. When the triple-tree partitioning method is not allowed, encoding/decoding information related to triple-tree partitioning for the coding blocks is omitted.

The coding block generated as a result of quad-tree partitioning, binary-tree partitioning, or triple-tree partitioning may be set as the basis for prediction or transform. That is, the coding block may be set as a prediction block or a transform block, and prediction, transform, or quantization may be performed on the coding block.

Alternatively, a size and/or a shape of at least one among the prediction block and the coding block may be set different from the size and/or the shape of the coding block. For example, by partitioning the coding block, prediction blocks or transform blocks in a size smaller than that of the coding block may be generated. Alternatively, multiple coding blocks may be set as one prediction block or transform block. For example, a transform unit for the coding blocks generated as a result of triple-tree partitioning may be determined as a parent partition region. The parent partition region may be a non-square or square region that includes at least one of three blocks generated as a result of triple-tree partitioning. That is, a parent node block including the coding blocks may be set at a transform unit for the coding blocks.

Figure 17:
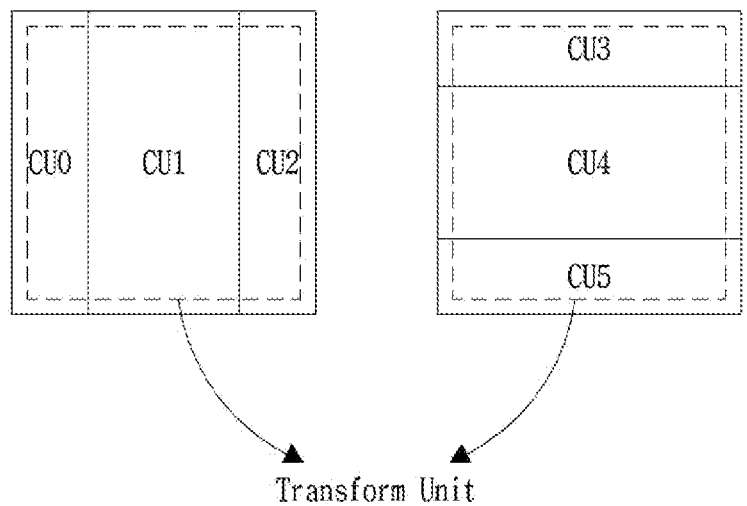
FIG. 17 is a diagram illustrating a transform unit of coding blocks resulting from triple-tree partitioning.

FIG. 17 is a diagram illustrating a transform unit of coding blocks resulting from triple-tree partitioning.

In FIG. 17(a), a transform unit of a CU0, CU1, and CU2 generated as a result of triple-tree partitioning may be set as a parent node block including the CU0, CU1, and CU2. That is, transform and/or quantization on the CU0, CU1, and CU2 may be performed on the basis of the parent node block including the CU0, CU1, and CU2.

In FIG. 17(b), a transform unit of a CU3, CU4, and CU5 generated as a result of triple-tree partitioning may be set as a parent node block including the CU3, CU4, and CU5. That is, transform and/or quantization on the CU3, CU4, and CU5 may be performed on the basis of the parent node block including the CU3, CU4, and CU5.

As described above, multiple coding blocks may be set as one transform unit. That is, transformation processing for setting a set of multiple coding blocks as one transform unit may be performing. In addition to the blocks generated through triple-tree partitioning, transformation processing may be performed on coding blocks generated through binary-tree partitioning or quad-tree partitioning. The transformation processing may be performed considering at least one among a shape of the coding block, a size of the coding block, a partition depth of the coding block, and a partition type of the parent node block. For example, the transformation processing is performed, when at least one of the following cases is satisfied: a case in which the size of the coding block is the minimum size; a case in which the partition depth of the coding block is the maximum partition depth; a case in which the coding block is in a non-square; and a case in which the size of the coding block is equal to or smaller than a predetermined size. When at least one of the multiple coding blocks satisfies the condition, the transformation processing is performed. The minimum size or the maximum partition depth may be predefined in the encoder and the decoder. Alternatively, information for determining the minimum size or the maximum partition depth may be signaled through a bitstream. The predetermined size may be preset in the encoder and the decoder.

Alternatively, it may be set that when the shape of the coding block is a shape preset in the encoder and the decoder, the transformation processing is performed. The preset shape may be a square shape (for example, 2×2 or 4×4) or a rectangular shape (for example, 2×4, 4×2, 2×8, or 8×2).

Alternatively, information indicating whether the transformation processing is performed may be signaled through a bitstream. For example, a flag indicating whether transformation processing is performed on any one of the multiple coding blocks may be signaled through a bitstream. Alternatively, information specifying the first coding block and the last coding block on which transformation processing is performed may be signaled through a bitstream.

Alternatively, information indicating a condition of performance of transformation processing may be signaled through a bitstream. The information may be about at least one among the shape of the coding block in which transformation processing is allowed, the size of the coding block, and the depth of the coding block.

Prediction may be performed on each of the multiple coding blocks, and transform or quantization may be performed on the transform block including the coding blocks.

The encoder may perform transform and/or quantization on a residual sample (or a residual signal) on a per-predetermined block basis. A unit block on which transform and/or quantization is performed may be defined as a transform block. As a result of performing transform and/or quantization on the residual sample, a residual coefficient may be generated. The residual coefficient may include at least one among a transform coefficient generated by transforming a residual sample, a quantized transform coefficient generated by quantizing the transform coefficient, and a quantized residual sample generated by quantizing a residual sample in which transform is skipped. Different transform blocks may be set for respective color components. For example, a size of a transform block for a luma component and a size of a transform block for a chroma component may be different. Transform and/or quantization may be independently performed on a luma component, a first chroma component Cb, and a second chroma component Cr.

The transform block may be in a square shape or a non-square shape. For example, the transform block may be in a square shape, such as 4×4, 8×, 16×16, 32×32, 64×64, or the like, or may be in a non-square shape, such as 4×8, 8×4, 8×16, 16×8, 16×32, 32×16, 32×64, 64×32, 4×16, 4×32, 8×32, or the like.

A block coding generated through multi-tree partitioning may be set as a transform block. Alternatively, a coding block may be partitioned into transform blocks in a smaller size. Alternatively, a transform block may be generated by merging multiple coding blocks. The number, sizes and/or shapes of the transform blocks included in the coding block, or the number, sizes, and/or shapes of the coding blocks included in the transform block may be determined on the basis of the minimum size of the transform block predefined in the encoder and the decoder, or on the basis of the size of the minimum block for scanning a transform coefficient.

At least one among information on whether the coding block is used as a transform block, information for partitioning the coding block into transform blocks, and information for merging the coding blocks into a transform block may be signaled through a bitstream. The information may be signaled at a sequence header, a picture header, a slice header, a tile group header, or a block level (for example, a coding block or a transform block).

The decoder may decode a residual coefficient from a bitstream received from the encoder, and may perform at least one among inverse quantization and inverse transform on the decoded residual signal, thereby decoding the residual sample (or the residual signal). A process of generating a residual signal by decoding a residual coefficient and performing at least one among inverse quantization and inverse transform on the decoded residual signal may be defined as "residual coefficient decoding".

Hereinafter, the residual coefficient decoding process will be described in detail.

Figure 18:
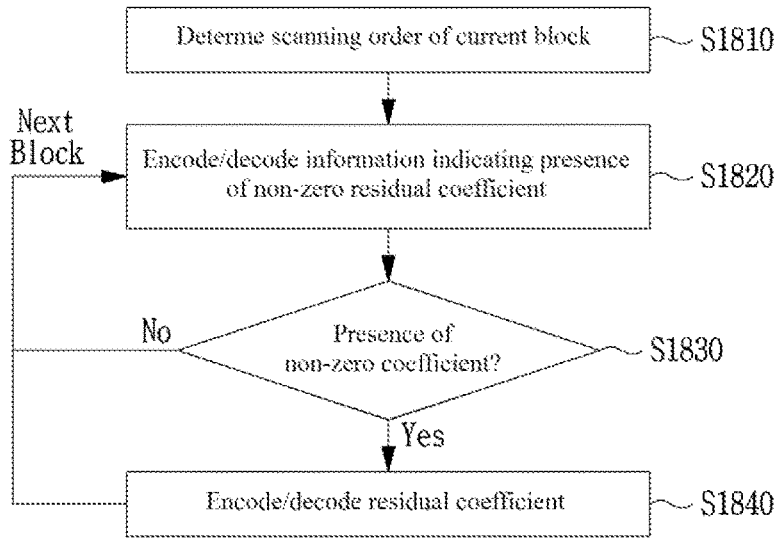
FIG. 18 a flowchart illustrating a process of acquiring a residual coefficient according to an embodiment to which the present invention is applied.

FIG. 18 is a flowchart illustrating a process of obtaining a residual coefficient according to an embodiment to which the present invention is applied.

A scanning order of the current block may be determined S1810. The scanning order may include at least one of diagonal scanning, Z scanning, zigzag scanning, horizontal scanning, or vertical scanning. The scanning order of the current block may be determined based on at least one of the size of the current block, the shape of the current block, the encoding mode of the current block, or the intra prediction mode of the current block.

Information indicating whether a non-zero residual coefficient is present within the current block may be encoded/decoded S1820. On the basis of the information, it may be determined whether to encode/decode a residual coefficient of the current block S1830.

The information may include a residual coefficient encoding indicator (coded_block_flag, CBF) indicating whether a residual coefficient is present within the current block. The residual coefficient encoding indicator may indicate whether a non-zero transform coefficient is present within a block. For example, the residual coefficient encoding indicator having a value of zero indicates that a non-zero residual coefficient is not present within a block, and the residual coefficient encoding indicator having a value of one indicates that at least one non-zero residual coefficient is present within a block. The residual coefficient encoding indicator may be encoded for each of luma and chroma components, and may be signaled.

The residual coefficient encoding indicator may include at least one among an indicator (for example, "rqt_root_cbf") signaled at a first level block, and an indicator (for example, "coded_sub_block_flag", CSBF) signaled at a second level block included in the first level block. The first level block indicates a transform block, a coding block, or a coding tree block. The second level block indicates a sub-block included in the second level block.

For example, the rqt_root_cbf may indicate whether a non-zero residual coefficient is included in the current block. The decoder may determine whether to decode the residual coefficient according to the rqt_root_cbf value. For example, when the rqt_root_cbf has a value of zero, residual coefficient decoding is not performed on the current block (for example, a current transform block) and all values of the residual samples within the current block are set to zero. Conversely, when the rqt_root_cbf has a value of one, residual coefficient decoding is performed within the current block.

When the size of the current block is larger than a predefined size, the coded_sub_block_flag is encoded/decoded. For example, the predefined size may be 4×4, 2×8, or 8×2. The coded_sub_block_flag may indicate whether a non-zero transform coefficient is included within a sub-block. For example, the coded_sub_block_flag may be encoded on a per-sub-block basis and may be signaled, wherein the sub-block is in a 4×4 size. The coded_sub_block_flag having a value of zero may indicate that a non-zero residual coefficient is not present within a sub-block, and the coded_sub_block_flag having a value of one may indicate that at least one non-zero residual coefficient is present within a sub-block.

Figure 19:
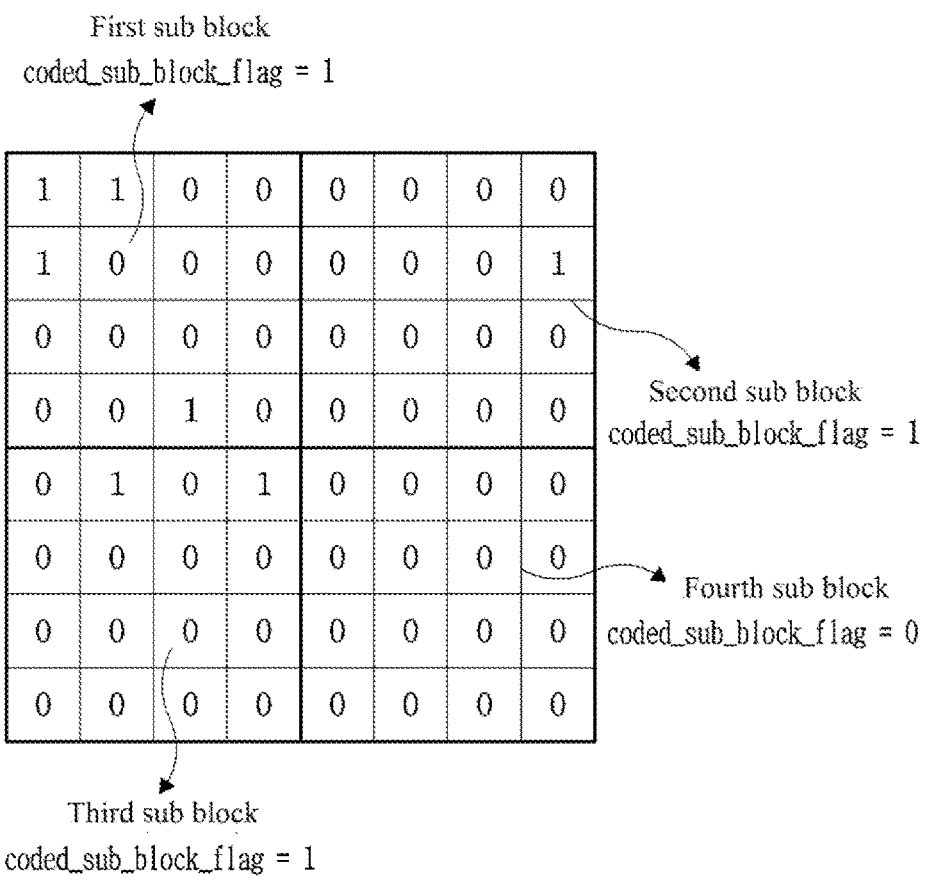
FIG. 19 is a diagram i an example in which a residual coefficient encoding indicator is encoded for each sub-block.

FIG. 19 is a diagram illustrating an example in which a residual coefficient encoding indicator is encoded for each sub-block.

First, a transform block in a 16×16 size includes a non-zero residual coefficient, and thus a rqt_root_flag for the transform block may be set to a value of one.

A coded_sub_block_flag may be set for each of 4×4-sized sub-blocks included in the transform block. When a non-zero residual coefficient is present within a sub-block in a 4×4 size, the coded_sub_block_flag of the sub-block is set to a value of one. For example, in FIG. 19, it is shown that a value of the coded_sub_block_flag for a first sub-block, a second sub-block, and a third sub-block that include non-zero residual coefficients is set to one. When a non-zero residual coefficient is not present within a sub-block in a 4×4 size, the coded_sub_block_flag of the sub-block is set to a value of zero. For example, in FIG. 19, it is shown that a value of the coded_sub_block_flag for a fourth sub-block not including a non-zero residual coefficient is set to zero.

The rqt_root_cbf and the coded_sub_block_flag may be encoded in a hierarchical manner and may be signaled. For example, when the rqt_root_cbf has a value of zero, encoding/decoding the coded_sub_block_flag is omitted. Conversely, when the rqt_root_cbf has a value of one and the size of the current block is larger than that of the sub-block, the coded_sub_block_flag is encoded for each sub-block within the current block and is signaled.

A residual coefficient encoding indicator even between the transform block and the coding block may be encoded in a hierarchical manner and may be signaled. For example, a first residual coefficient encoding indicator indicating whether at least one transform block including a non-zero residual coefficient is included among multiple transform blocks may be encoded/decoded. Depending on the value of the first residual coefficient encoding indicator, it may be determined whether to encode/decode a second residual coefficient encoding indicator for each transform block. Herein, at least one among a size and a shape of a parent block including multiple transform blocks may have a predefined value or may be determined through information signaled through a bitstream. Alternatively, at least one among a size and a shape of a parent block may be determined on the basis of a partition type of a coding tree block. For example, a non-square coding block or a square coding block including multiple non-square transform blocks may be defined as a parent block for multiple non-square transform blocks. The residual coefficient encoding indicator may be encoded in a hierarchical manner through two or more hierarchies.

As above, a method of encoding a residual coefficient encoding indicator in a hierarchical manner may be referred to as a hierarchical residual-coefficient encoding indicator (hierarchical coded block flag, HCBF) derivation method.

As a result of performing at least one of quad-tree partitioning, binary-tree partitioning, or triple-tree partitioning, a coding block of which the width or the height or both are smaller than a predefined value may be generated. For example, a coding block of which the width or the height or both are smaller than a value of four may be generated. The coding block of which the width or the height or both are smaller than the value of four may be defined as an ultra-small asymmetric coding unit.

At least one of sizes, shapes, or the number of sub-blocks included in the current block may be determined on the basis of at least one of the size of the current block, the shape of the current block, or the quantization parameter of the current block. For example, a sub-block included in a coding block of which the width and the height are greater than a value of four may be in a 4×4 size. Accordingly, a coded_sub_block_flag may be encoded for each 4×4-sized sub-block. Conversely, a sub-block included in a coding block of which the width or the height or both are smaller than a value of four may be in a 2×2, 2×4, 4×2, 2×8, or 8×2 size. Accordingly, a coded_sub_block_flag may be encoded for each sub-block that is in a 2×2, 2×4, 4×2, 2×8, or 8×2 size.

FIGS. 20A to 20C and 21A to 21C are diagrams illustrating encoding aspects of a coded_sub_block_flag for an ultra-small asymmetric coding unit.

Figure 20A:
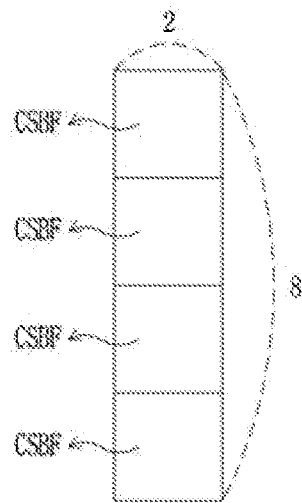
FIGS. 20A to 20C and 21A to 21C are diagrams illustrating encoding aspects of a coded_sub_block_flag for an ultra-small asymmetric coding unit.
Figure 20B:
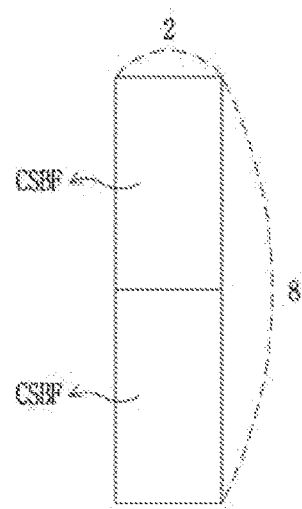
Figure 20C:
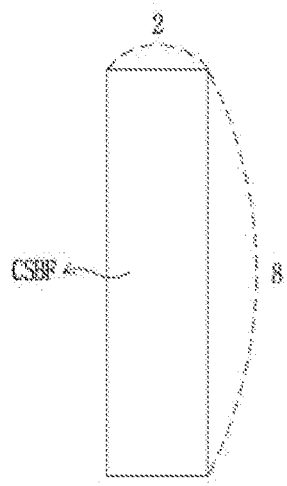

For an ultra-small asymmetric coding block in a 2×N size, a CSBF may be encoded for each sub-block in a 2×2, 2×4, or 2×8 size. FIG. 20A is a diagram illustrating a case in which a sub-block is in a 2×2 size. FIG. 20B is a diagram illustrating a case in which a sub-block is in a 2×4 size. FIG. 20C is a diagram illustrating a case in which a sub-block is in a 2×8 size.

Figure 21A:
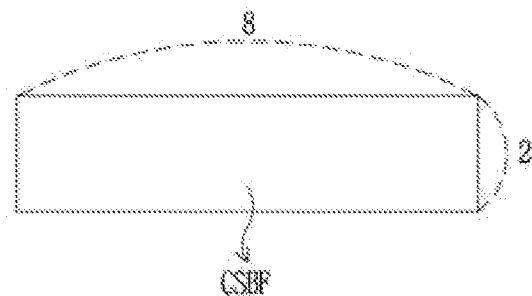
Figure 21B:
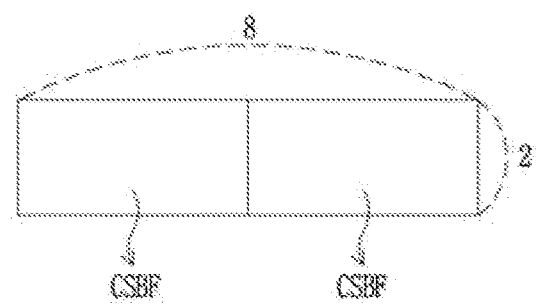
Figure 21C:
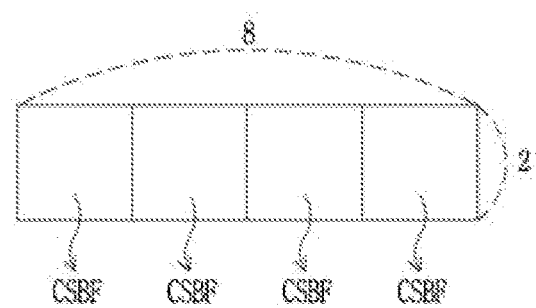

For an ultra-small asymmetric coding block in an N×2 size, a CSBF may be encoded for each sub-block in a 2×2, 4×2, or 8×2 size. FIG. 21A is a diagram illustrating a case in which a sub-block is in a 8×2 size. FIG. 21B is a diagram illustrating a case in which a sub-block is in a 4×2 size. FIG. 21C is a diagram illustrating a case in which a sub-block is in a 2×2 size.

Information indicating at least one of the size, the shape of the sub-block, or the number of the sub-blocks included in the coding block may be signaled through a bitstream. On the basis of the information, the size and/or the shape of the sub-block included in the ultra-small asymmetric coding block may be determined. A CSBF may be encoded on the basis of a sub-block determined using the information. The information may be signaled at a sequence header, a picture header, a slice header, a tile group header, a tile header, or a block level. The information may indicate at least one of the size of the sub-block, the shape of the sub-block, or the number of sub-blocks included in the coding block. Alternatively, the information may indicate the minimum unit in which the CSBF is encoded, the maximum unit in which the CSBF is encoded, or a difference value between the minimum unit and the maximum unit in which the CSBF is encoded.

Alternatively, on the basis of a preset number of samples, a sub-block may be defined. Herein, the preset number may be four, eight, 16, or more. The preset number may be predefined in the encoder and the decoder. Alternatively, the preset number may be determined based on at least of the size of the coding block, the shape of the coding block, or the quantization parameter of the coding block. Alternatively, information for determining the preset number may be signaled through a bitstream. The information may indicate the minimum number of samples of the sub-block in which the CSBF is encoded, the maximum number of samples of the sub-block in which the CSBF is encoded, or a difference value between the minimum number of samples and the maximum number of samples.

Figure 22:
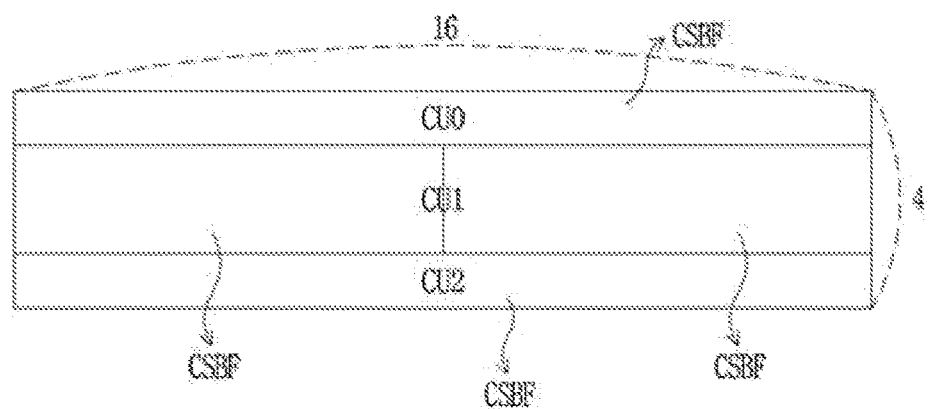
FIG. 22 is a diagram illustrating an example in which a residual coefficient encoding indicator is encoded for each sub-block including a preset number of samples.

FIG. 22 is a diagram illustrating an example in which a residual coefficient encoding indicator is encoded for each sub-block including a preset number of samples.

In the example shown in FIG. 22, a CU0 and a CU2 are ultra-small asymmetric coding blocks in a 1×16 size, and a CU1 is an ultra-small asymmetric coding block in a 2×16 size.

Assuming that a CSBF is included for a group of 16 samples, for the CU0 and the CU2 each including 16 samples, a CSBF may be encoded without partitioning into sub-blocks. Alternatively, for the CU0 and the CU2, encoding/decoding the CSBF may be omitted, and a rqt_root_flag may be encoded/decoded.

The CU1 including 32 samples may be partitioned into two sub-blocks, and a CSBF may be encoded/decoded for each of the sub-blocks. In FIGS. 20A to 20C, it is shown that the sub-blocks included in the CU1 are in 2×8 sizes, but it is possible to set the size of the sub-blocks different from the shown example. For example, the CU1 may be partitioned into two sub-blocks in 1×16 sizes.

When a non-zero residual coefficient is included within the current block, an absolute value and/or a sign of each residual coefficient is encoded/decoded according to the scanning order for the current block S1840.

When at least one non-zero residual coefficient is included in the current block or the sub-block, a residual coefficient is encoded/decoded using an residual coefficient level indicator that indicates whether the residual coefficient is zero. The residual coefficient level indicator is a one-bit flag (for example, "significant_flag" or "sig_coeff_flag") and indicates whether each residual coefficient within the current block is zero. For example, the significant_flag having a value of one indicates that the residual coefficient is not zero, and the significant_flag having a value of zero indicates that the residual coefficient is zero. The non-zero residual coefficient may be referred to as a significant residual coefficient.

A transform coefficient level of all residual coefficients within a block may be referred to as a residual coefficient level map (significant map). The encoder may encode the residual coefficient level map, and may then encode an absolute value and a sign of the significant residual coefficient. Specifically, the encoder may encode the position of the last significant transform coefficient according to the scanning order of the current block, and may perform inverse transform scanning, starting from the last significant transform coefficient, to encode a residual coefficient level indicator for each residual coefficient. Inverse transform scanning may be performed in the reverse direction of the scanning order. In addition, an absolute value and a sign of the significant transform coefficient may be encoded.

The absolute value of the significant transform coefficient may be encoded using at least one among a flag (gt1_flag) indicating whether the absolute value of the significant transform coefficient is greater than one, a flag (parity_level_flag) indicating whether the absolute value of the significant transform coefficient or a value obtained by subtracting one from the significant transform coefficient is an even number, a flag (gt3_flag) indicating whether the absolute value of the significant transform coefficient is greater than three, and a value (abs_remainder) obtained by subtracting three from the absolute value of the significant transform coefficient.

The encoding of the CSBF, the encoding of the residual coefficient level indicator, and the encoding of the absolute value and the sign of the significant transform coefficient may be repeatedly performed until encoding the last residual coefficient is completed.

The decoder may decode the position of the last significant residual coefficient, and may decode a significant residual coefficient level indicator for the samples, starting from the first sample to the last sample.

When it is indicated that the absolute value of the significant transform coefficient is not greater than one, it is determined that the absolute value of the significant transform coefficient is one. When it is indicated that the absolute value of the significant transform coefficient is greater than one and is not greater than three, the absolute value of the significant transform coefficient is determined by the flag indicating whether the absolute value of the significant transform coefficient is an even number. For example, when is indicated that a value obtained by it subtracting one from the significant transform coefficient is an odd number, it is determined that the absolute value of the significant transform coefficient is two. When it is indicated that a value obtained by subtracting one from the significant transform coefficient is an even number, it is determined that the absolute value of the significant transform coefficient is three. When an absolute value of a significant transform coefficient is greater than three, the absolute value of the significant transform coefficient is determined by decoding a value obtained by subtracting three from the absolute value of the significant transform coefficient, and by adding three to the decoded value.

On the basis of a residual coefficient at a preset position among residual coefficients included in a block in an M×N size, a value of the residual coefficient positioned in a preset direction from the preset transform coefficient may be adjusted. Herein, the block in the M×N size may refer to a transform block, or a sub-block included in the transform block. A value of M and a value of N may be determined according to the size of the transform block or the sub-block. The preset direction may be determined according to the scanning order of the current block. For example, a residual coefficient value of residual coefficients of which the scanning order has a lower priority than that of the residual coefficient at the preset position, or a residual coefficient value of residual coefficients of which the scanning order has a higher priority than those of the residual coefficients at the preset position may be adjusted. Alternatively, the preset direction may be a direction predefined in the encoder and the decoder. For example, the preset direction may be a leftward direction, a rightward direction, an upward direction, a downward direction, or a diagonal direction.

The adjusting of the value of the residual coefficient may refer to at least one of changing the value of the residual coefficient to be the same as a residual coefficient adjustment reference value, changing the value of the residual coefficient to a value smaller than the residual coefficient adjustment reference value, or changing the value of the residual coefficient to zero.

Figures 23, 24:
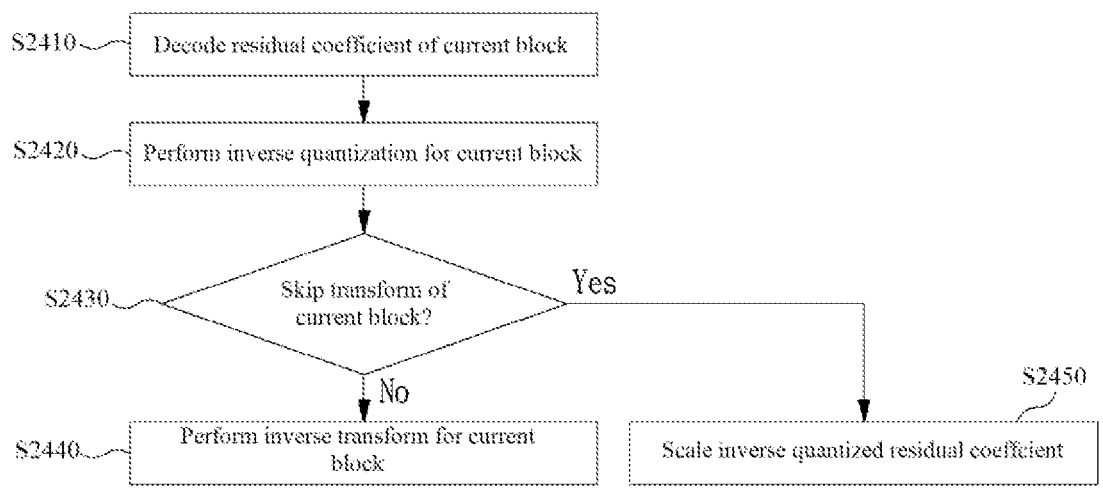
FIG. 23 is a diagram illustrating an example in which a value of a residual coefficient is adjusted.
FIG. 24 is a flowchart illustrating processes of obtaining a residual sample according to an embodiment to which the present invention is applied.

FIG. 23 is a diagram illustrating an example in which a value of a residual coefficient is adjusted.

The scanning order of each of M×N residual coefficients included in an M×N-sized block may be identified by a scanning index of each of the residual coefficients. In addition, a preset scanning order may be defined as a residual coefficient adjustment index. An absolute value of the residual coefficient of which the scanning index has a lower priority than the residual coefficient adjustment index among the M×N residual coefficients may be adjusted to a residual coefficient adjustment reference value or less.

For example, the absolute value of the residual coefficient that is later than the eighth in the scanning order may be set not to exceed one. Referring to FIG. 23, under diagonal scanning, values of the residual coefficients, starting from a scanning index of 0 to a scanning index of 7, are (13, 10, 2, 4, −5, 8, −1, −3, 1). Among the residual coefficients (that is, the residual coefficients of which the scanning indexes are greater than seven) which is later than the eighth in the scanning order, the absolute value of the residual coefficient of which the absolute value exceeds one may be set to one or less. For example, the absolute value of the residual coefficient (that is, the residual coefficient having a scanning index of 13) which is the 14-th in the scanning order is two, and thus the absolute value of the residual coefficient may be changed to one.

An adjustment index may be determined on the basis of the number of samples included in a block. For example, an adjustment index for M×N residual coefficients may be set to (M×N)>>1. Alternatively, an adjustment index may be determined on the basis of the position of the last significant transform coefficient. For example, the adjustment index may be set to (LastSigPos+1)>>1 or (LastSigPos−1)>>1. The position of the last significant transform coefficient may be denoted by LastSigPos. Alternatively, information for determining the adjustment index may be signaled through a bitstream. The information may be signaled through a sequence parameter, a picture level, a slice header, a tile group, a tile, a transform block, or a residual encoding syntax.

Alternatively, a value of an adjustment index may be predefined in the encoder and the decoder.

The residual coefficient adjustment reference value may be set to a non-zero integer value. The residual coefficient adjustment reference value may be predefined in the encoder or the decoder. Alternatively, the residual coefficient adjustment reference value may be defined in a sequence level, a picture level, a slice level, or a block level. For example, a predefined residual coefficient adjustment value may be used in all slices, or a residual coefficient adjustment value may be determined for each slice.

Alternatively, on the basis of the adjustment index, a residual coefficient adjustment reference value may be determined. For example, a value of the residual coefficient of which the scanning index is the adjustment index, a value of the first significant residual coefficient among the residual coefficients of which the scanning indexes are greater than the adjustment index, or a value of the first significant residual coefficient among the residual coefficients of which the scanning indexes are smaller than the adjustment index may be set as the residual coefficient adjustment reference value.

The absolute value of the significant residual coefficient of which the scanning index has a lower priority than the adjustment index may be set to the residual coefficient adjustment reference value or less. Accordingly, the absolute value of the residual coefficient may not be encoded, or only minimum information for determining the absolute value of the residual coefficient may be encoded. For example, when the residual coefficient adjustment reference value is one, it is determined that the absolute value of the significant residual coefficient of which the scanning index has a lower priority than the adjustment index is one. As a result, absolute values of the residual coefficients of which the scanning indexes have lower priorities than the adjustment index may be set the same as a value of a residual coefficient level indicator. Accordingly, encoding/decoding at least one among the gt1_flag, parity_level_flag, gt3_flag, and abs_remainder for determining the absolute value of the significant residual coefficient may be omitted.

For example, when the residual coefficient adjustment reference value is two, it is determined that the absolute value of the significant residual coefficient of which the scanning index has a lower priority than the adjustment index is one or two. As a result, absolute values of the residual coefficients of which the scanning indexes have lower priorities than the adjustment index may be set the same as the sum of the residual coefficient level indicator and the value of the gt1_flag. Accordingly, encoding/decoding at least one among the parity_level_flag, gt3_flag, and abs_remainder for determining the absolute value of the significant residual coefficient may be omitted.

For example, when the residual coefficient adjustment reference value is three, it is determined that the absolute value of the significant residual coefficient of which the scanning index has a lower priority than the adjustment index is one, two, or three. As a result, absolute values of the residual coefficients of which the scanning indexes have lower priorities than the adjustment index may be set the same as the sum of the residual coefficient level indicator, the value of the gt1_flag, and the parity_level_flag. Accordingly, encoding/decoding at least one among the gt3_flag, and abs_remainder for determining the value the absolute of significant residual coefficient may be omitted.

That is, by adjusting the absolute value of the significant residual coefficient to the residual coefficient adjustment reference value or less, the number of bits required for determining the absolute value of the significant residual coefficient is reduced, so that the encoding/decoding efficiency may be improved.

Information indicating whether an absolute value of the residual coefficient is adjusted may be signaled through a bitstream. The information may be a one-bit flag. For example, the flag having a value of true indicates the fact that the absolute values of the residual coefficients of which the scanning indexes are greater than the adjustment index, within the current block are adjusted. The flag having a value of false indicates the fact that the absolute values of the residual coefficients within the current block not are adjusted.

FIG. 24 is a flowchart illustrating processes of obtaining a residual sample according to an embodiment to which the present invention is applied.

First, a residual coefficient of a current block may be obtained S2410. A decoder may obtain a residual coefficient through a coefficient scanning method. For example, the decoder may perform a coefficient scan using a diagonal scan, a jig-zag scan, an up-right scan, a vertical scan, or a horizontal scan, and may obtain residual coefficients in a form of a two-dimensional block.

An inverse quantization may be performed on the residual coefficient of the current block S2420.

It is possible to determine whether to skip an inverse transform on the dequantized residual coefficient of the current block S2430. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block S2440. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value S2450.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse skip scheme may be transform restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through bitstream. For example, the information indicating whether or not to skip the inverse transform on the horizontal direction is a 1-bit flag, 'hor_transform_skip_flag', and information indicating whether to skip the inverse transform on the vertical direction a is 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least of "hor_transform_skip_flag" or one "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

The names of syntax used in the above-described embodiments are only named for convenience of description.

The application of the embodiments described focusing on the decode process or encoding process to the encoding process or decoding process is included in the scope of the present invention. The change of the embodiments described in a predetermined order into a different order is also included in the scope of the present invention.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed i:
1. A method of decoding a video signal, the method comprising:
  determining whether at least one non-zero residual coefficient is included in a current transform block;
  decoding residual coefficients of the current transform block;
  performing an inverse-quantization for the current transform block;

determining whether an inverse-transform is skipped for the current transform block or not;

obtaining residual samples of the current transform block by performing or skipping the inverse-transform for the current transform block; and obtaining reconstruction samples by summing the residual samples and prediction samples, wherein the residual coefficients in the current transform block are decoded in a unit of a sub-block, wherein a size of the sub-block is determined based on whether at least one of a width or a height of the current transform block is less than 4, wherein in response that at least one of the width or the height of the current transform block is less than 4, the size of the sub-block is determined as 2×2, 2×8, or 8×2, wherein in response that both the width and the height of the current block are equal to or greater than 4, the size of the sub-block is determined as 4×4, wherein whether a transform skip flag, indicating whether the inverse-transform is skipped or not, of the current transform block is present in a bitstream or not is determined based on whether a coding block, including the current transform block, is partitioned into a plurality of transform blocks in a horizontal direction or a vertical direction, and wherein in response that the current transform block is one of the plurality of transform blocks generated by partitioning the coding block in the horizontal direction or the vertical direction, the transform skip flag of the current transform block is not present in the bitstream, and skipping the inverse-transform is not allowed for the current transform block.

2. The method of claim 1, wherein in response to a determination that the inverse-transform is not skipped for the current transform block, obtaining the residual samples of the current transform block comprises:

performing a first inverse-transform on inverse-quantized residual coefficients resulting from the inverse-quantization; and performing a second inverse-transform on first inverse-transformed residual coefficients resultant from the first inverse-transform, wherein residual coefficients, each of which a scanning order is earlier than a residual coefficient at a position pre-defined in a decoder, are equal to 0, and information on the residual coefficients, each of which the scanning order is earlier than the residual coefficient at the position pre-defined in the decoder, is not present in a bitstream.

3. The method of claim 1, wherein the scanning order of the current transform block is determined by a diagonal scanning order or an inverse-diagonal scanning order.

4. The method of claim 1, wherein a residual coefficient in the current transform block is restored by information decoded from the bitstream, wherein the information comprises a first absolute value flag indicating whether an absolute value of the residual coefficient is greater than 1 is decoded from the bitstream, wherein when the first absolute value flag indicates that the absolute value of the residual coefficient is greater than 1, the information further comprises a parity flag indicating whether the absolute value is an even number or an odd number and a second absolute value flag indicating whether the absolute value of the residual coefficient is greater than 3 are further decoded from the bitstream.

5. The method of claim 4, wherein when the second absolute value flag indicates that the absolute value of the residual coefficient is not greater than 3, the absolute value of the residual coefficient is determined, based on the parity flag, as either 2 or 3.

6. A method of encoding a video signal, the method comprising:

obtaining prediction samples;

obtaining residual samples of a current transform block by subtracting the prediction samples from original samples;

obtaining transform coefficients of the current transform block;

obtaining residual coefficients by performing a quantization on the transform coefficients;

encoding a coded block flag indicating whether at least one non-zero residual coefficient is included in the current transform block; and encoding the residual coefficients of the current transform block, wherein the residual coefficients in the current transform block are encoded in a unit of a sub-block, wherein a size of the sub-block is determined based on whether at least one of a width or a height of the current transform block is less than 4, wherein in response that at least one of the width or the height of the current transform block is less than 4, the size of the sub-block is determined as 2×2, 2×8, or 8×2, wherein in response that both the width and the height of the current block are equal to or greater than 4, the size of the sub-block is determined as 4×4, wherein whether to encode a transform skip flag, indicating whether the transform is skipped or not, of the current transform block into a bitstream or not is determined based on whether a coding block, including the current transform block, is partitioned into a plurality of transform blocks in a horizontal direction or a vertical direction, and wherein in response that the current transform block is one of the plurality of transform blocks generated by partitioning the coding block in the horizontal direction or the vertical direction, encoding the transform skip flag of the current transform block is omitted, and the transform is not skipped for the current transform block.

7. A device for transmitting compressed video data, comprising:

a processor configured to obtain the compressed video data; and a transmitter configured to transmit the compressed video data, wherein obtaining the compressed video data comprises:

obtaining prediction samples;

obtaining residual samples of a current transform block by subtracting the prediction samples from original samples;

obtaining transform coefficients of the current transform block;

obtaining residual coefficients by performing a quantization on the transform coefficients;

encoding a coded block flag indicating whether at least one non-zero residual coefficient is included in the current transform block; and encoding the residual coefficients of the current transform block, wherein the residual coefficients in the current transform block are encoded in a unit of a sub-block, wherein a size of the sub-block is determined based on whether at least one of a width or a height of the current transform block is less than 4, wherein in response that at least one of the width or the height of the current transform block is less than 4, the size of the sub-block is determined as 2×2, 2×8, or 8×2, wherein in response that both the width and the height of the current block are equal to or greater than 4, the size of the sub-block is determined as 4×4, wherein whether to encode a transform skip flag, indicating whether the transform is skipped or not, of the current transform block into a bitstream or not is determined based on whether a coding block, including the current transform block, is partitioned into a plurality of transform blocks in a horizontal direction or a vertical direction, and wherein in response that the current transform block is one of the plurality of transform blocks generated by partitioning the coding block in the horizontal direction or the vertical direction, encoding the transform skip flag of the current transform block is omitted, and the transform is not skipped for the current transform block.

* * * * *

UNITED STATES PATENT AND TRADEMARK OFFICE
CERTIFICATE OF CORRECTION

| | | |
|---|---|---|
| PATENT NO. | : 12,355,948 B2 | Page 1 of 1 |
| APPLICATION NO. | : 18/602300 | |
| DATED | : July 8, 2025 | |
| INVENTOR(S) | : Bae Keun Lee | |

It is certified that error appears in the above-identified patent and that said Letters Patent is hereby corrected as shown below:

In the Claims

In Claim 3, Column 41, Line 50, please replace "claim 1," with --claim 2,--.

Signed and Sealed this
Thirtieth Day of September, 2025

John A. Squires
*Director of the United States Patent and Trademark Office*